(12) United States Patent
Zheng et al.

(10) Patent No.: US 10,715,390 B2
(45) Date of Patent: Jul. 14, 2020

(54) SERVICE OPTIMIZATION METHOD, TRANSPORT CONTROLLER, CLIENT CONTROLLER, AND SYSTEM

(71) Applicant: Huawei Technologies Co., Ltd., Shenzhen (CN)

(72) Inventors: Haomian Zheng, Shenzhen (CN); Hong Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 328 days.

(21) Appl. No.: 15/486,056

(22) Filed: Apr. 12, 2017

(65) Prior Publication Data
US 2017/0222879 A1    Aug. 3, 2017

Related U.S. Application Data

(63) Continuation of application No. PCT/CN2014/088473, filed on Oct. 13, 2014.

(51) Int. Cl.
*H04L 12/24* (2006.01)
*H04L 12/725* (2013.01)
(Continued)

(52) U.S. Cl.
CPC ...... *H04L 41/0893* (2013.01); *H04L 41/0896* (2013.01); *H04L 45/306* (2013.01);
(Continued)

(58) Field of Classification Search
CPC . H04L 41/0893; H04L 41/0896; H04L 41/12; H04L 45/306; H04L 69/326; H04W 28/06; H04W 76/12; H04W 76/22
See application file for complete search history.

(56) References Cited

U.S. PATENT DOCUMENTS 8,174,970 B2 *  5/2012  Adamczyk ............ H04L 63/102
                                                     370/230
8,665,709 B2     3/2014  Young
                  (Continued)

FOREIGN PATENT DOCUMENTS

CN        1802030 A      7/2006
CN      102546379 A      7/2012
                  (Continued)

OTHER PUBLICATIONS

Chen et al.; "Routing-as-a-Service (RaaS): A Framework for Tenant-Directed Route Control in Data Center"; IEEE INFOCOM 2011; Shanghai, China; Apr. 10, 2011; 10 pages.

*Primary Examiner* — Todd L Barker
(74) *Attorney, Agent, or Firm* — Kilpatrick Townsend & Stockton LLP

(57) ABSTRACT

Embodiments of the present invention disclose a service optimization method, a transport controller (TC), a client controller (CC), and a service optimization system. The method includes: receiving, by a TC, an optimization request from a CC; sending, by the TC, an answer message to the CC when determining that an idle resource in a resource pool can meet an optimization requirement of the CC; receiving, by the TC, an optimization instruction of the CC; and optimizing, by the TC according to the optimization policy in the optimization instruction, the service identified in the optimization instruction. When an idle network resource in the resource pool can meet the optimization requirement of the CC, the TC executes the optimization policy that meets the optimization requirement of the CC, so as to reduce a service interruption phenomenon in a service optimization process.

17 Claims, 15 Drawing Sheets

(51) Int. Cl.
*H04L 29/08* (2006.01)
*H04W 76/22* (2018.01)
*H04W 76/12* (2018.01)
*H04W 28/06* (2009.01)

(52) U.S. Cl.
CPC ............ *H04L 69/326* (2013.01); *H04L 41/12* (2013.01); *H04W 28/06* (2013.01); *H04W 76/12* (2018.02); *H04W 76/22* (2018.02)

(56) References Cited

U.S. PATENT DOCUMENTS

| | | | | |
|---|---|---|---|---|
| 9,032,077 | B1* | 5/2015 | Klein | ...................... H04L 29/08 370/395.21 |
| 10,172,068 | B2* | 1/2019 | Mosko | ................... H04W 40/04 |
| 2006/0159014 | A1 | 7/2006 | Breiter et al. | |
| 2008/0259850 | A1* | 10/2008 | Dai | ....................... H04W 60/00 370/328 |
| 2010/0195535 | A1 | 8/2010 | Ziller et al. | |
| 2010/0291943 | A1* | 11/2010 | Mihaly | ............. H04L 29/12066 455/450 |
| 2011/0197239 | A1 | 8/2011 | Schlack | |
| 2014/0050078 | A1 | 2/2014 | Sato et al. | |
| 2014/0173113 | A1 | 6/2014 | Vemuri et al. | |
| 2015/0089082 | A1* | 3/2015 | Patwardhan | ............ H04L 45/44 709/243 |
| 2015/0124718 | A1* | 5/2015 | Molinero Fernandez | ................... H04L 65/1016 370/329 |
| 2015/0180730 | A1* | 6/2015 | Felstaine | ............... H04L 41/022 709/225 |
| 2017/0257276 | A1* | 9/2017 | Chou | .................. H04L 41/0823 |

FOREIGN PATENT DOCUMENTS

| | | |
|---|---|---|
| CN | 103067298 A | 4/2013 |
| CN | 103124436 A | 5/2013 |
| CN | 103473117 A | 12/2013 |
| CN | 104065745 A | 9/2014 |
| EP | 2048834 A1 | 4/2009 |

* cited by examiner

SERVICE OPTIMIZATION METHOD, TRANSPORT CONTROLLER, CLIENT CONTROLLER, AND SYSTEM

CROSS-REFERENCE TO RELATED APPLICATIONS

This application is a continuation of International Application No. PCT/CN2014/088473, filed on Oct. 13, 2014, the disclosure of which is hereby incorporated by reference in its entirety.

TECHNICAL FIELD

The present application relates to the communications field, and more specifically, to a service optimization method and an apparatus.

BACKGROUND

On a transport network, a CC (client controller) manages a transport subnet, and a TC (transport controller) manages one or more CCs. The CC is equivalent to a tenant. A physical network resource is divided into a virtual network topology by the TC according to a tenant requirement, and then is provided to the tenant (CC). The TC maintains a physical network resource allocation status and global network topology information, and puts a resource that is not allocated to any CC into a resource pool for centralized scheduling and management.

The CC may control and manage its own virtual network topology resources. For example, a CC1 may allocate a path 1 in the virtual network topology resource to bear a service 1, and allocate a path 2 in the virtual network topology resource to bear a service 2. A resource that is not allocated to any service is put into a resource pool of the CC for centralized scheduling and management by the CC.

When the present invention creation is implemented, the inventor finds that, in many cases, the CC needs to perform online optimization on a service, for example, a service is adjusted from an original path to another path. When the online optimization is performed, an establishment-before-disconnection manner may be used: The CC establishes, by using an available virtual resource in a resource pool managed by the CC, an optimization path to bear a service and achieve performance optimization (which includes but is not limited to a delay, a hop count, and a cost). When the optimized service connection is successfully established, an original service path of the service is disconnected. Therefore, the online optimization may be completed without interrupting the service. However, when an available virtual network resource managed by the CC is insufficient, an establishment-before-disconnection procedure cannot be completed. Therefore, a network service cannot be optimized without interrupting a service.

SUMMARY

In view of this, an objective of embodiments of the present invention is to provide a service optimization method, a transport controller, a client controller, and a service optimization system, so as to reduce a service interruption phenomenon in a service optimization process.

To achieve the foregoing objective, the embodiments of the present invention provide the following technical solutions:

According to a first aspect of the embodiments of the present invention, a service optimization method is provided, including:

receiving, by a transport controller TC, an optimization request from a client controller CC, where the optimization request carries identification information of a service and information about a route that the service needs to pass through;

sending, by the TC, an answer message to the CC when determining that an idle resource in a resource pool can meet an optimization requirement of the CC, where the answer message carries the identification information of the service and an optimization policy that meets the optimization requirement of the CC;

receiving, by the TC, an optimization instruction of the CC, where the optimization instruction carries the identification information of the service and a corresponding optimization policy that meets the optimization requirement of the CC; and optimizing, by the TC according to the optimization policy in the optimization instruction, the service identified in the optimization instruction.

With reference to the first aspect, in a first possible implementation manner, the optimization policy that meets the optimization requirement of the CC is used to indicate establishment-before-disconnection.

With reference to the first aspect, in a second possible implementation manner, the optimization request further carries an interruption policy for a specific service, and the method further includes: when determining that the idle resource in the resource pool cannot meet the optimization requirement of the CC, sending, by the TC, to the CC, an answer message that carries the identification information of the service and an optimization policy that meets the interruption policy; receiving, by the TC, an optimization instruction of the CC, where the optimization instruction carries the identification information of the service and a corresponding optimization policy that meets the interruption policy; and optimizing, by the TC according to the optimization policy in the optimization instruction, the service identified in the optimization instruction.

With reference to the first possible implementation manner or the second possible implementation manner of the first aspect, in a third possible implementation manner, if the optimization instruction received by the TC includes identification information of a single service, and an optimization policy for the single service, the optimizing, by the TC according to the optimization policy in the optimization instruction, the service identified in the optimization instruction specifically includes: optimizing, by the TC, the single service according to the optimization policy in the optimization instruction.

With reference to the first possible implementation manner or the second possible implementation manner of the first aspect, in a fourth possible implementation manner, if the optimization instruction received by the TC includes identification information of multiple services and an optimization policy for the multiple services, the optimizing, by the TC according to the optimization policy in the optimization instruction, the service identified in the optimization instruction specifically includes: optimizing, by the TC, the multiple services according to the optimization policy in the optimization instruction.

With reference to any one of the first aspect, or the first to the fourth possible implementation manners of the first aspect, in a fifth possible implementation manner, the information about the route carries node information about a node that the service passes through, and the node includes a start node and an end node; and the determining, by the TC, whether the idle resource in the resource pool can meet the optimization requirement of the CC specifically includes: determining whether an idle resource between the start node and the end node in the resource pool meets the optimization requirement of the CC.

According to a second aspect of the embodiments of the present invention, a service optimization method is provided, including:

receiving, by a transport controller TC, an optimization request from a client controller CC, where the optimization request carries identification information of a service, information about a route that the service needs to pass through, and authorization information, and the authorization information is used to authorize the TC to directly complete service optimization; and optimizing, according to an optimization policy that meets an optimization requirement of the CC, the service identified in the optimization request when the TC determines that an idle resource in a resource pool can meet the optimization requirement of the CC.

With reference to the second aspect, in a first possible implementation manner, the optimizing, according to an optimization policy that meets an optimization requirement of the CC, the service identified in the optimization request includes: adjusting, by using the idle resource in the resource pool, the service identified in the optimization instruction to the to-pass-through route without service interruption.

With reference to the second aspect or the first possible implementation manner of the second aspect, in a second possible implementation manner, the optimization policy that meets the optimization requirement of the CC is used to indicate establishment-before-disconnection.

With reference to the second aspect, in a third possible implementation manner, the optimization request further carries an interruption policy for a specific service, and the method further includes: optimizing, according to an optimization policy that meets the interruption policy, the service identified in the optimization request when the TC determines that the idle resource in the resource pool cannot meet the optimization requirement of the CC.

With reference to the third possible implementation manner of the second aspect, in a fourth possible implementation manner, the optimizing, according to an optimization policy that meets the interruption policy, the service identified in the optimization request includes: interrupting, by the TC according to the interruption policy, the specific service to release a network resource; and adjusting, by the TC, an uninterrupted service to a to-pass-through route without service interruption.

With reference to the fourth possible implementation manner of the second aspect, in a fifth possible implementation manner, the optimizing, according to an optimization policy that meets the interruption policy, the service identified in the optimization request further includes: establishing, by the TC, a to-pass-through route for an interrupted service.

According to a third aspect of the embodiments of the present invention, a service optimization method is provided, including:

sending, by a client controller CC, an optimization request to a transport controller TC, where the optimization request carries identification information of a service and information about a route that the service needs to pass through;

receiving, by the CC, an answer message returned by the TC, where the answer message carries the identification information of the service and a corresponding optimization policy; and sending, by the CC, an optimization instruction to the TC, where the optimization instruction carries the identification information of the service and a corresponding optimization policy, and the optimization instruction is used by the TC to optimize, according to the optimization policy in the optimization instruction, the service identified in the optimization instruction; where when the TC determines that an idle resource in a resource pool can meet an optimization requirement of the CC, both the optimization policy carried by the answer message and the optimization policy carried by the optimization instruction are optimization policies that meet the optimization requirement of the CC.

With reference to the third aspect, in a first possible implementation manner, the optimization request further carries an interruption policy for a specific service; and when the TC determines that the idle resource in the resource pool cannot meet the optimization requirement of the CC, both the optimization policy carried by the answer message and the optimization policy carried by the optimization instruction are optimization policies that meet the interruption policy.

According to a fourth aspect of the embodiments of the present invention, a transport controller is provided, including:

a first data receiver, configured to receive an optimization request from a client controller CC, where the optimization request carries identification information of a service and information about a route that the service needs to pass through;

a data transmitter, configured to send an answer message to the CC when a processor determines that an idle resource in a resource pool can meet an optimization requirement of the CC, where the answer message carries the identification information of the service and a corresponding optimization policy;

a second data receiver, configured to receive an optimization instruction of the CC, where the optimization instruction carries the identification information of the service and a corresponding optimization policy; and a processor, configured to optimize, according to the optimization policy in the optimization instruction, the service identified in the optimization instruction; where when the processor determines that the idle resource in the resource pool can meet the optimization requirement of the CC, both the optimization policy carried by the answer message and the optimization policy carried by the optimization instruction are optimization policies that meet the optimization requirement of the CC.

With reference to the fourth aspect, in a first possible implementation manner, the optimization request further carries an interruption policy for a specific service; and when the processor determines that the idle resource in the resource pool cannot meet the optimization requirement of the CC, both the optimization policy carried by the answer message and the optimization policy carried by the optimization instruction are optimization policies that meet the interruption policy.

According to a fifth aspect of the embodiments of the present invention, a transport controller is provided, including:

a data receiver, configured to receive an optimization request from a client controller CC, where the optimization request carries identification information of a service, information about a route that the service needs to pass through, and authorization information, and the authorization information is used to authorize the TC to directly complete service optimization; and a processor, configured to optimize, according to an optimization policy that meets an optimization requirement of the CC, the service identified in the optimization request when determining that an idle resource in a resource pool can meet the optimization requirement of the CC.

According to a sixth aspect of the embodiments of the present invention, a client controller is provided, including:

a first data transmitter, configured to send an optimization request to a transport controller TC to which the first data transmitter is connected, where the optimization request carries identification information of a service and information about a route that the service needs to pass through;

a data receiver, configured to receive an answer message that is from the TC and that carries the identification information of the service and an optimization policy; and a second data transmitter, configured to send an optimization instruction to the TC, where the optimization instruction carries the identification information of the service and a corresponding optimization policy, and the optimization instruction is used by the TC to optimize, according to the optimization policy in the optimization instruction, the service identified in the optimization instruction; where when the TC determines that an idle resource in a resource pool can meet an optimization requirement of the CC, both the optimization policy carried by the answer message and the optimization policy carried by the optimization instruction are optimization policies that meet the optimization requirement of the CC.

According to a seventh aspect of the embodiments of the present invention, a service optimization system is provided, including a transport controller TC and a client controller CC, where the CC is configured to: send an online optimization request to the TC, where the optimization request carries identification information of a service and information about a route that the service needs to pass through; receive an answer message that is of the TC and that carries the identification information of the service and an optimization policy that meets an optimization requirement of the CC; and send an optimization instruction to the TC, where the optimization instruction carries the identification information of the service and an optimization policy that meets the optimization requirement of the CC; and the TC is configured to: when determining that a resource in a resource pool can meet the optimization requirement of the CC, send the answer message to the CC; and optimize, according to the optimization policy in the optimization instruction, the service identified in the optimization instruction.

It can be learned that, in the embodiments of the present invention, a CC may send an optimization request to a TC to use an idle network resource in a TC resource pool. When an idle network resource in a resource pool can meet an optimization requirement of the CC, the TC executes an optimization policy that meets the optimization requirement of the CC to help the CC implement service optimization without service interruption, so as to reduce a service interruption phenomenon in a service optimization process.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention.

Figure 1:
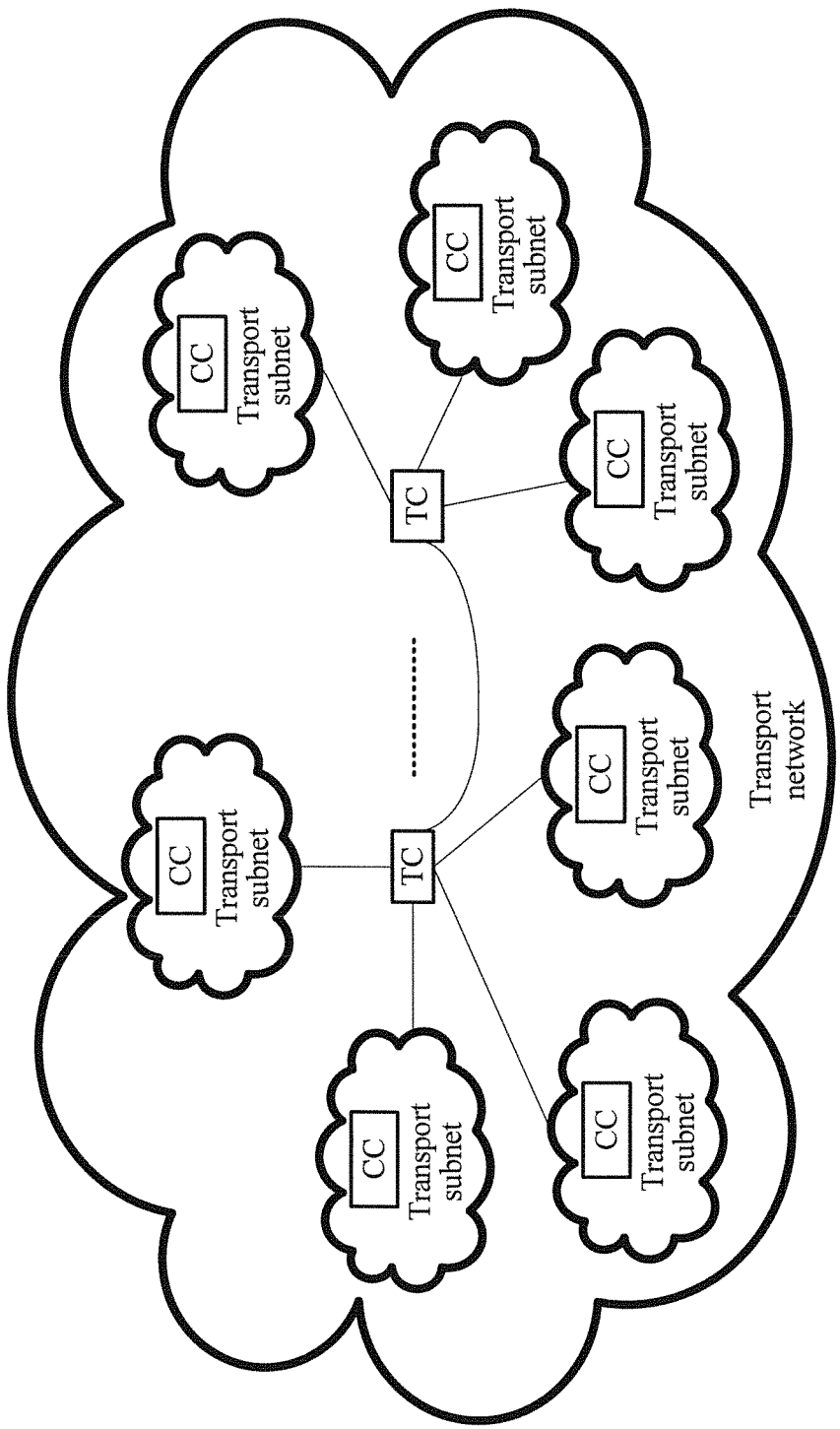
FIG. 1 is an exemplary diagram of a structure of a transport network according to an embodiment of the present invention.

On a transport network, referring to FIG. 1, a CC (client controller) manages a transport subnet, and a TC (transport controller) manages one or more CCs.

On the transport network, the CC is equivalent to a tenant; a physical resource is divided into a virtual network topology by the TC according to a tenant requirement, and then is provided to the tenant (CC); resources between different CCs are independent, and the CCs cannot know existence of each other.

Figure 2:
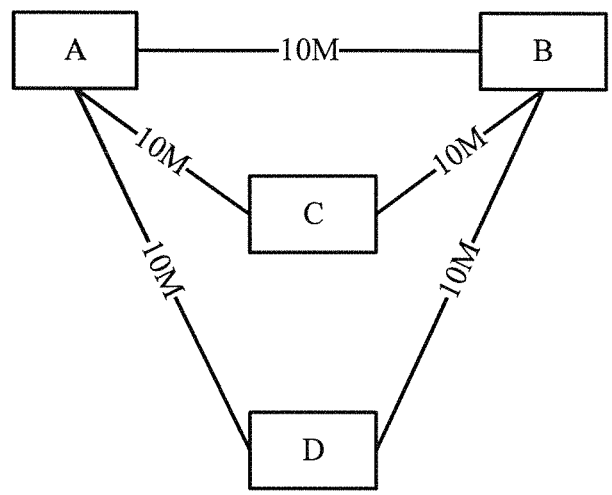
FIG. 2 is a diagram of an actual network topology according to an embodiment of the present invention.

For example, an actual (physical) network topology is shown in FIG. 2. A bandwidth of a link AB between a node A and a node B is 10M, the node A and the node B may further be connected by using a node C and a node D, and bandwidths of a link AC, a link BC, a link AD, and a link BD are all 10M.

Figure 3:
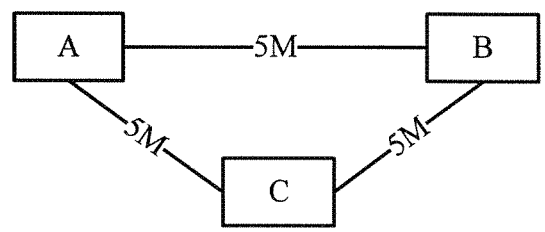
FIG. 3 and FIG. 4 are diagrams of virtual network topologies according to an embodiment of the present invention.

A network resource that a TC allocates to a CC1 is as follows: 5M for the link AB, 5M for the link AC, and 5M for the link BC. To the CC1, a virtual network topology is shown in FIG. 3.

Figure 4:
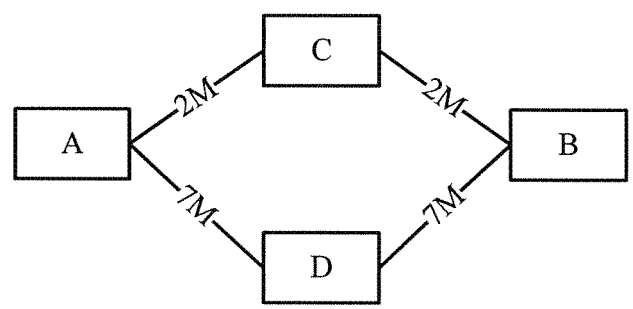

A network resource that a TC allocates to a CC2 is as follows: 2M for the link AC, 2M for the link BC, 7M for the link AD, and 7M for the link BD. To the CC2, a virtual network topology is shown in FIG. 4.

A CC may control and manage its own virtual network topology resources. For example, a CC1 may allocate a path A-C-B to bear a service 1, and allocate a path A-B to bear a service 2. The CC can establish/delete/change/query the virtual network topology resource of the CC. A resource that is not allocated to any service is put into a resource pool of the CC for centralized scheduling and management by the CC.

In addition to maintaining a physical network resource allocation status and global network topology information, and putting a resource that is not allocated to any CC into a resource pool for centralized scheduling and management, a TC further records a current virtual network resource allocation status of each CC. For example, the TC records that the CC1 allocates the path A-C-B to bear the service 1 and allocates the path A-B to bear the service 2; and the TC further records bandwidths respectively occupied by the service 1 and the service 2.

In many cases, a CC needs to perform online optimization on a service.

Figure 5:
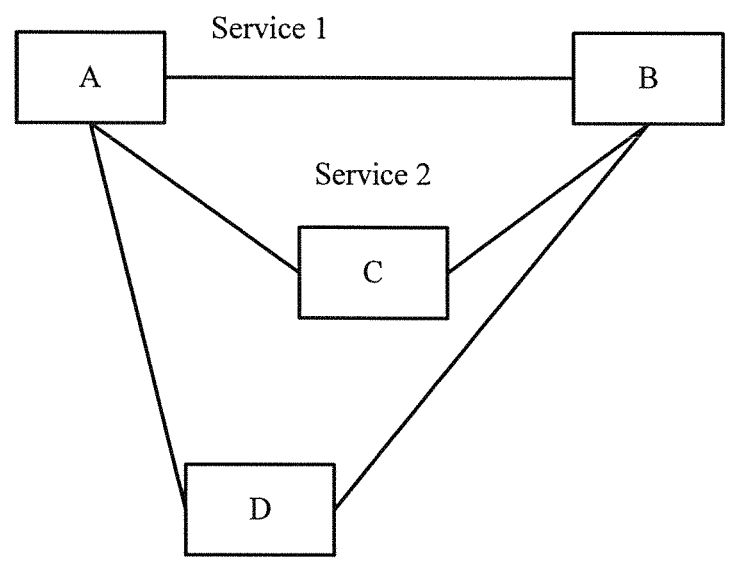
FIG. 5 is a service distribution diagram according to an embodiment of the present invention.

For example, referring to FIG. 5, both a service 1 and a service 2 are from a node A to a node B, the service 1 passes through a path A-B, and the service 2 passes through a path A-C-B (it is assumed that bandwidths occupied by the service 1 and the service 2 are the same and are both 10M). Online optimization is performed according to a user requirement, which requires the service 1 to pass through the path A-C-B, and the service 2 to pass through the path A-B.

Figure 6:
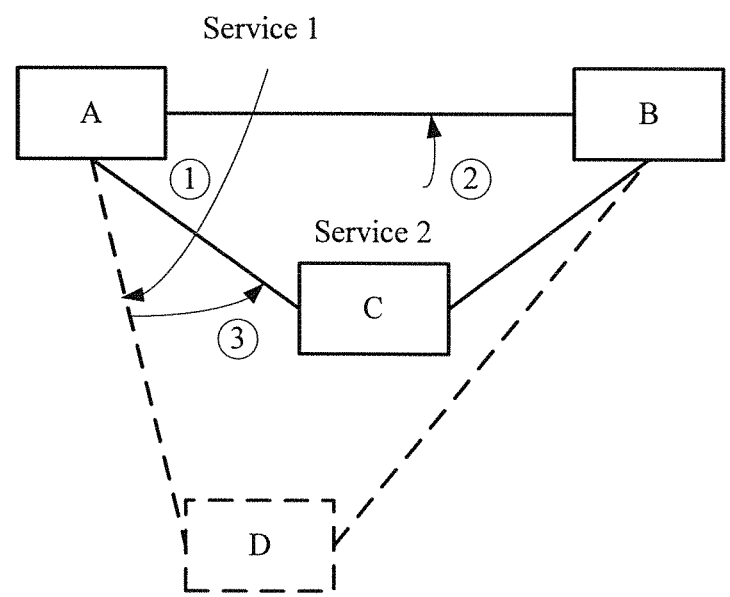
FIG. 6 and FIG. 7 are exemplary diagrams of service optimization according to an embodiment of the present invention.

It is assumed that a path A-D-B in a resource pool of a CC is idle and a bandwidth of the path A-D-B is 11M. Referring to FIG. 6, online optimization is implemented by using the following establishment-before-disconnection procedure:

(1) The CC establishes a path whose route is A-D-B for a service 1, and then disconnects a path whose route is A-B of the service 1, so that the path whose route is A-B is released.

(2) The CC establishes a path whose route is A-B for a service 2, and then disconnects a path whose route is A-C-B of the service 2.

(3) The CC establishes a path whose route is A-C-B for the service 1, and then disconnects the path whose route is A-D-B of the service 1.

In this way, it may be implemented that the service 1 passes through the path A-C-B and the service 2 passes through the path A-B by means of three times of establishment-before-disconnection.

However, if a resource in a resource pool managed by a CC is insufficient (when a bandwidth of A-D-B is only 5M), establishment-before-disconnection cannot be performed, so that a network service cannot be optimized without interrupting a service.

Figure 7:
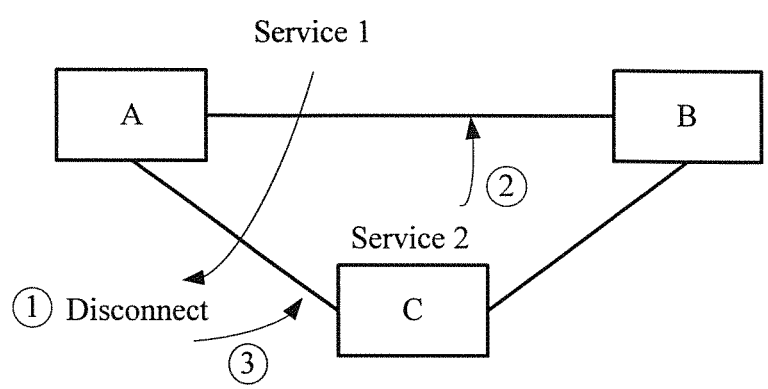

In this case, referring to FIG. 7, an existing manner may be processed as following:

(1) Disconnect a path whose route is A-B of a service 1 (or disconnect a path whose route is A-C-B of a service 2).

(2) Establish a path whose route is A-B for a service 2, and then disconnect the path whose route is A-C-B of the service 2; (or establish a path whose route is A-C-B for a service 1, and then disconnect the path whose route is A-B of the service 1).

(3) Establish the service 1 in the path whose route is A-C-B and that is released by the service 2 (or establish the service 2 in the path whose route is A-B and that is released by the service 1).

However, service interruption is caused in the processing shown in FIG. 7.

Therefore, an embodiment of the present invention provides a service optimization solution, so as to reduce a service interruption phenomenon in a service optimization process.

A core of the service optimization solution provided in this embodiment of the present invention is: a CC sends an optimization request to a TC to request a temporary resource in a TC resource pool, and a TC tries its best to allocate the temporary resource, so as to help the CC implement service optimization without service interruption.

The service optimization solution provided in this embodiment of the present invention may be applied to the following scenario.

Figure 8:
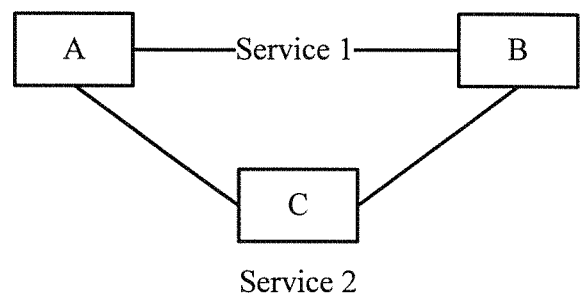
FIG. 8 is a diagram of a virtual network topology according to an embodiment of the present invention.

A virtual topology of a network of a CC1 is shown in FIG. 8, and includes three nodes (A, B, and C) and two services (a service 1 and a service 2). It is assumed that bandwidths of the two services are the same. Both the service 1 and the service 2 are from a node A to a node B: the service 1 passes through a path A-B, and the service 2 passes through a path A-C-B.

Now, online optimization is performed according to a user requirement, which requires the service 1 to pass through the path A-C-B and the service 2 to pass through the path A-B.

Figure 9:
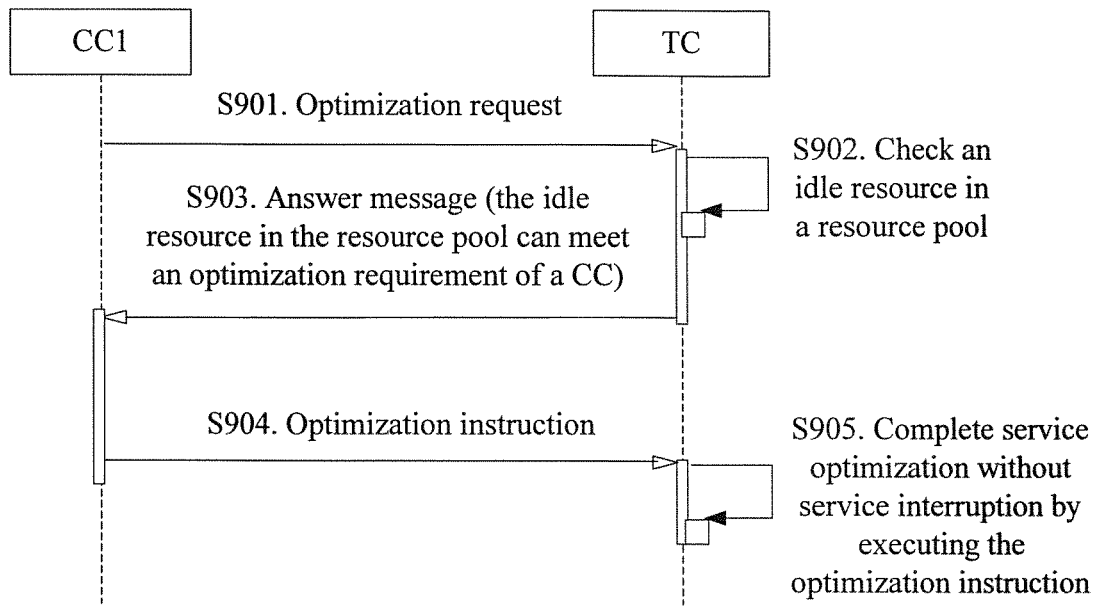
FIG. 9 is an interaction flowchart according to an embodiment of the present invention.

After checking all of its own virtual resources, the CC1 determines that if the CC1 needs to complete service online optimization (for example, exchange between a service 1 and a service 2) on a virtual topology, at least one service needs to be interrupted (that is, the service 1 and the service 2 cannot be adjusted, by using an available virtual resource of the CC1, to a to-pass-through path/route without service interruption). In a service optimization solution provided in this embodiment of the present invention, there may be the following interaction process between the CC1 and a TC (refer to FIG. 9).

S901. The CC1 sends an optimization request to a TC.

The optimization request may carry identification information of a service (for example, a service ID) and information about a route that the service needs to pass through.

More specifically, the information about the route may carry node information about a node that the service passes through, and the node includes a start node (a source node) and an end node (a sink node).

For example, in this scenario, the optimization request may include the following content:

a service 1: (a route that the service 1 needs to pass through) A-C-B; and a service 2: (a route that the service 2 needs to pass through) A-B.

When only some routes need to be adjusted, in another embodiment of the present invention, compared with a current path, the foregoing optimization request may include some adjusted routes in a route that a service needs to pass through.

As mentioned above, the TC records a current virtual network resource allocation status of each CC. Therefore, the optimization request may not include a current route (path) of a service, and the TC may learn a current route of the service identified in the optimization request by searching for a record.

Alternatively, to save time of the TC and improve efficiency, in another embodiment of the present invention, the foregoing optimization request may also include the current route (path) of the service, so that the TC does not need to search for a record.

S902. The TC checks a resource pool, and determines whether an idle resource in the resource pool can meet an optimization requirement of a CC.

The resource pool may include a TC resource pool and a CC resource pool.

The idle resource may include an idle resource (a path, and a bandwidth of a path) between the source node and the sink node. For example, if an optimization request includes "a service 1: (a route that the service 1 needs to pass through) A-C-B; and a service 2: (a route that the service 2 needs to pass through) A-B", the TC checks a path between a source node A and a sink node B and the bandwidth of the path.

Correspondingly, the determining whether an idle resource in the resource pool can meet an optimization requirement of a CC may specifically include: determining whether an idle resource between the start node and the end node in the resource pool meets the optimization requirement of the CC.

The optimization requirement of the CC may specifically include: adjusting, the service identified in the optimization request to the route that the service needs to pass through without service interruption.

S903. The TC sends an answer message to the CC1 when finding that there is still an idle resource in a route between a source node and a sink node of a service 1, and the idle resource may be used to help the CC1 complete online optimization without service interruption (that is, the idle resource in the resource pool can meet the optimization requirement of the CC).

The answer message may carry identification information of a service and an optimization policy that meets the optimization requirement of the CC.

More specifically, the foregoing optimization policy may include an indication of a path disconnection and establishment sequence for at least one service.

Figure 10:
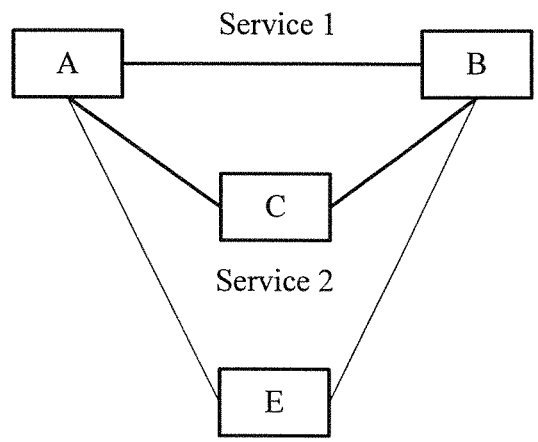
FIG. 10 is a diagram of an actual network topology according to an embodiment of the present invention.

Refer to FIG. 10. It is assumed that if the TC finds that a path whose route is A-E-B between a source node and a sink node of the service 1 is idle (a path whose route is A-E-B is an idle resource in the TC resource pool), the answer message that is sent by the TC to the CC1 may include:

establishing a TC route for bearing the service 1;
disconnecting an (existing) A-B route that bears the service 1;
establishing an A-B route for bearing the service 2;
disconnecting an (existing) A-C-B route that bears the service 2;
establishing an A-C-B route for bearing the service 1; and
disconnecting a TC route that bears the service 1.

It should be noted that, in FIG. 10 that is used as an example, the path whose route is A-E-B is not a path in a virtual network topology of the CC1. Therefore, the path whose route is A-E-B does not need to be included in the answer message and is simply replaced by using "a TC route" (or another equivalent term).

S904. After receiving the answer message, the CC1 initiates an optimization instruction to the TC.

The optimization instruction carries the identification information of the service and an optimization policy that meets the optimization requirement of the CC.

The optimization policy in the optimization instruction is consistent with the optimization policy in the answer message, and may indicate a path disconnection and establishment sequence for at least one service.

S905. The TC optimizes, according to an optimization policy in the optimization instruction, the service identified in the optimization instruction.

More specifically, the service identified in the optimization instruction is adjusted, by using the idle resource in the resource pool, to a to-pass-through route without service interruption.

In another embodiment of the present invention, the optimization instruction received by the TC may include identification information of a single service and an optimization policy for the single service, and that "the TC optimizes, according to an optimization policy in the optimization instruction, the service identified in the optimization instruction" may specifically include:

optimizing, by the TC, the single service according to the optimization policy in the optimization instruction.

In addition, the optimization instruction received by the TC may include identification information of multiple services and an optimization policy for the multiple services, and that "the TC optimizes, according to an optimization policy in the optimization instruction, the service identified in the optimization instruction" may specifically include:

optimizing, by the TC, the multiple services according to the optimization policy in the optimization instruction.

If the optimization instruction carries the identification information of the single service and the optimization policy for the single service, steps S904 and S905 may further be refined into a multi-step interaction process.

FIG. 10 is still used as an example, and an interaction process between the CC1 and the TC is as follows:

(1) The CC1 initiates an optimization instruction to instruct the TC to "establish a TC route for bearing a service 1" (establishing the TC route for bearing the service 1 is an optimization policy).

(2) The TC establishes, by using the idle resource in the TC resource pool as a temporary resource, a path whose route is A-E-B for the service 1. After completing the operation, the TC sends a completion message to the CC1.

It should be noted that the CC1 does not know that the TC uses the path whose route is A-E-B as the temporary resource. The CC1 only needs to instruct the TC to establish a TC route for the service 1, and the TC determines a path to be used.

(3) After receiving the completion message, the CC1 initiates an optimization instruction to instruct the TC to "disconnect an A-B route that bears a service 1".

(4) The TC disconnects a path whose route is A-B of the service 1 in a virtual network leased by the CC1. After completing the operation, the TC sends a completion message to the CC1.

After the path whose route is A-B of the service 1 is disconnected, a current idle resource in the resource pool of the CC1 is updated to include the path whose route is A-B.

(5) After receiving the completion message, the CC1 initiates an optimization instruction again to instruct the TC to "establish an A-B route for bearing a service 2".

(6) After receiving the optimization instruction that is used to instruct to "establish an A-B route for bearing a service 2", the TC establishes, by using a resource (that is, using an idle resource in a resource pool of the CC1) in a network leased by the CC1, a path whose route is A-B for the service 2. After completing the operation, the TC sends a completion message to the CC1.

(7) After receiving the completion message, the CC1 initiates an optimization instruction again to instruct the TC to "disconnect an A-C-B route that bears a service 2".

(8) The TC disconnects a path whose route is A-C-B of the service 2 in the network leased by the CC1. After completing the operation, the TC sends a completion message to the CC1.

After the path whose route is A-C-B of the service 2 is disconnected, a current idle resource in the resource pool of the CC1 is updated to include the path whose route is A-C-B.

(9) After receiving the completion message, the CC1 initiates an optimization instruction again to instruct the TC to "establish an A-C-B route for bearing a service 1".

(10) The TC establishes, by using the resource (that is, using the idle resource in the resource pool of the CC1) in the network leased by the CC1, the path whose route is A-C-B for the service 1. After completing the operation, the TC sends a completion message to the CC1.

(11) After receiving the completion message, the CC1 initiates an optimization instruction again to instruct the TC to "disconnect a TC route that bears a service 1".

(12) The TC disconnects a path whose route is A-E-B of the service 1 (that is, taking back a temporary resource). After completing the operation, the TC sends a completion message to the CC1.

For a specific implementation manner of establishment-before-disconnection, refer to the prior art. Details are not described herein.

It can be learned that a service 1 and a service 2 may be optimized without service interruption by means of the foregoing interaction.

Figure 11:
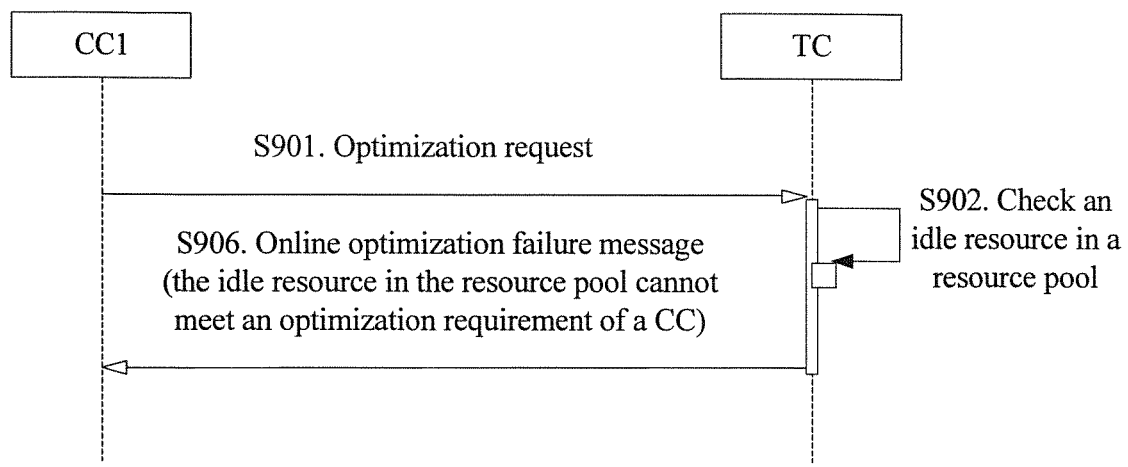
FIG. 11 is another interaction flowchart according to an embodiment of the present invention.

Certainly, the foregoing steps S903 to S905 are performed only when the idle resource in the resource pool can meet the optimization requirement of the CC. If the idle resource in the resource pool cannot meet the optimization requirement of the CC, the TC may return an optimization failure message. For a corresponding interaction process, refer to FIG. 11.

Alternatively, in another embodiment of the present invention, the foregoing optimization request may further include authorization information, and the authorization information is used to authorize a transport controller to directly complete service optimization, so that online optimization between the TC and the CC is completed without transferring an answer message or an optimization instruction.

More specifically, an authorization flag bit may be set in the foregoing optimization request, and the authorization flag bit may be set to 0 or 1 to indicate whether authorization is granted. For example, when the authorization flag bit is set to 0, it indicates that authorization is not granted, and when the authorization flag bit is set to 1, it indicates that authorization is granted; or when the authorization flag bit is set to 0, it indicates that authorization is granted, and when the authorization flag bit is set to 1, it indicates that authorization is not granted.

Figure 12:
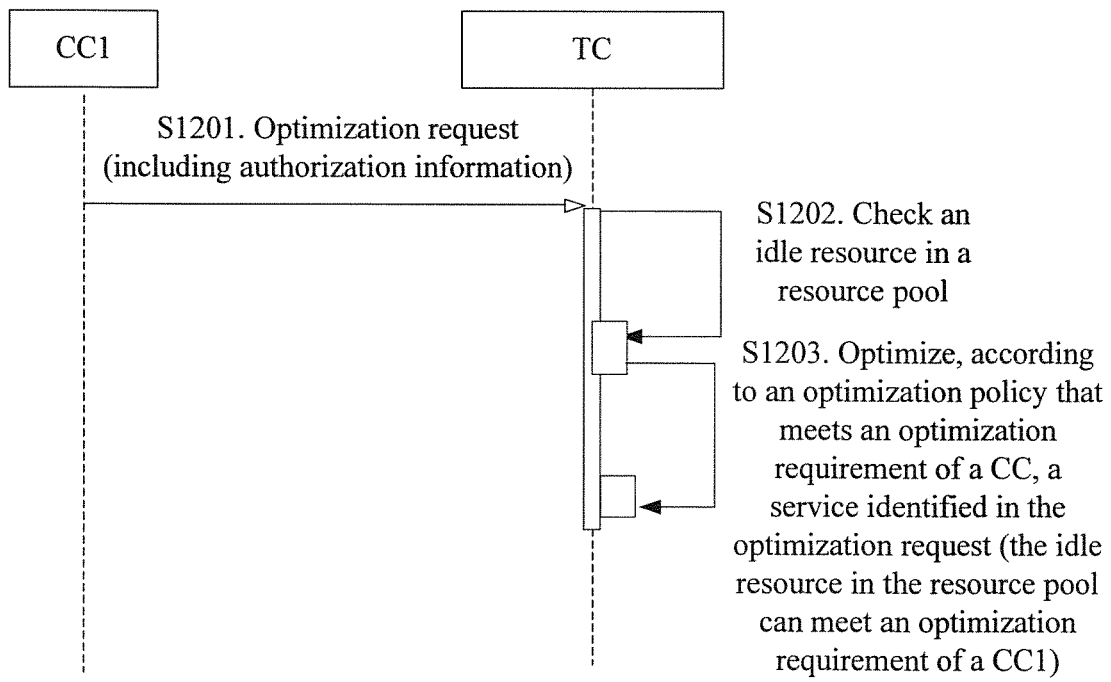
FIG. 12 is another flowchart of interaction between a CC and a TC according to an embodiment of the present invention.

If the optimization request includes the authorization information, referring to FIG. 12, in a service optimization solution provided in this embodiment of the present invention, there may be the following interaction process between a CC1 and a TC.

S1201. The CC1 sends an optimization request to the TC. The optimization request carries a service ID, a route that the service needs to pass through, and authorization information.

Step S1201 is similar to step S901. Details are not described herein again.

S1202. The TC checks a resource pool, and determines whether an idle resource in the resource pool can meet an optimization requirement of a CC.

Step S1202 is similar to step S902. Details are not described herein again.

S1203: When determining that the idle resource in the resource pool can meet the optimization requirement of the CC, the TC optimizes, according to an optimization policy that meets the optimization requirement of the CC, the service identified in the optimization request.

More specifically, the foregoing "optimizing, according to an optimization policy that meets the optimization requirement of the CC, the service identified in the optimization request" may include: adjusting, by using the idle resource in the resource pool, the service identified in the optimization request to the to-pass-through route without service interruption.

In the scenarios shown in FIG. 8 and FIG. 10, online optimization performed by the TC is as follows:

(1) The TC establishes, by using a resource in a TC resource pool as a temporary resource, a path whose route is A-E-B for a service 1, and then the TC disconnects a path whose route is A-B of the service 1 in a virtual network leased by the CC1.

(2) The TC establishes, by using a resource in a network leased by the CC1, a path whose route is A-B for a service 2, and then the TC disconnects a path whose route is A-C-B of the service 2 in the network leased by the CC1.

(3) The TC establishes, by using the resource in the network leased by the CC1, a path whose route is A-C-B for the service 1, and then the TC disconnects a path whose route is A-E-B of the service 1 (that is, taking back the temporary resource). After completing the operation, the TC sends an adjustment success message to the CC1.

For a specific implementation manner of establishment-before-disconnection, refer to the prior art. Details are not described herein.

The service 1 and the service 2 may be optimized without service interruption by means of the foregoing interaction.

It should be noted that the foregoing step S1203 is performed when the idle resource in the resource pool can meet the optimization requirement of the CC. If the idle resource in the resource pool cannot meet the optimization requirement of the CC, the TC may return an optimization failure message.

It can be learned that, in this embodiment of the present invention, a CC may send an optimization request to a TC to use an idle network resource in a TC resource pool. When an idle network resource in a resource pool can meet an optimization requirement of the CC, the TC executes an optimization policy that meets the optimization requirement of the CC to help the CC implement service optimization without service interruption, so as to reduce a service interruption phenomenon in a service optimization process.

Figure 13:
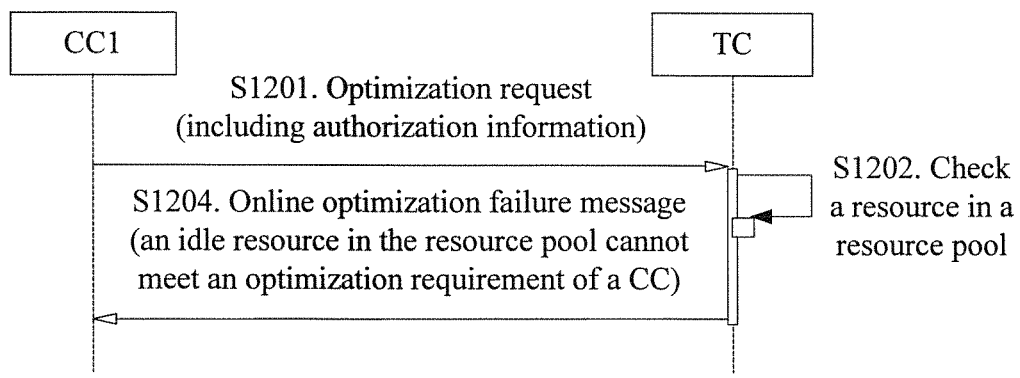
FIG. 13 is another flowchart of interaction between a CC and a TC according to an embodiment of the present invention.

In all the foregoing embodiments, referring to FIG. 13, if an idle resource in a resource pool cannot meet an optimization requirement of a CC, a TC returns an optimization failure message.

In the following embodiment of the present invention, an optimization request may further include an interruption policy for a specific service, where the interruption policy is used to indicate a service that is allowed to be interrupted (which may be referred to as an interruptible service) and that is in the service identified in the optimization request. The TC searches for again, according to the interruption policy, a service optimization solution that meets a CC request.

Further, when there are at least two interruptible services, the foregoing interruption policy is further used to indicate an interruption sequence for the foregoing at least two interruptible services.

For example, if there are five services D1 to D5, and D1 to D3 are interruptible services, the interruption policy may further indicate an interruption sequence of D1 to D3. It is assumed that the interruption sequence is D2, D3, and D1, the TC may subsequently interrupt these three services according to a sequence of D2→D3→D1.

When the CC formulates an interruption policy, various requirements may be considered. In an example in which a common rule in the industry is considered, the CC may formulate the interruption policy according to the following principle.

If services have service priorities, a service of a low service priority is preferably interrupted.

In services of a same service priority, a service that occupies a key path is preferably interrupted.

In services that are of a same service priority and that occupy a same key path, a service of a highest bandwidth is preferably interrupted.

If the foregoing conditions are the same, a service that occupies a largest quantity of resources (for example, a largest hop count) is preferably interrupted.

More specifically, an interruption priority may be used to indicate an interruption sequence. For example, if an interruption priority of D1 to D3 is D2>D3>D1, D2 is preferably interrupted.

Certainly, when an interruption policy is formulated, another aspect may further be considered. The formulation rule of the interruption policy is not limited in the present invention.

Using another scenario as an example, the following introduces how the TC searches for again, according to an interruption policy, a service optimization solution that meets the CC request when a resource in a resource pool cannot meet an optimization requirement of the CC.

Figure 14:
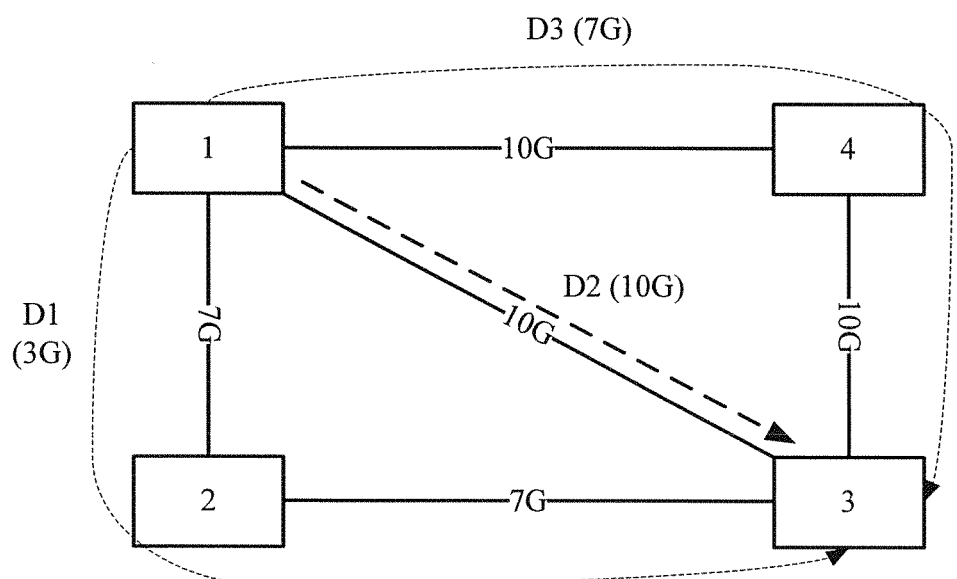
FIG. 14 is a diagram of a virtual network topology managed by a CC1 according to an embodiment of the present invention.

Consider the following scenario: FIG. 14 is a virtual network topology managed by a CC1. There are five links in the foregoing virtual network topology, and bandwidth distribution for the links is as follows: 7G for each of links 1-2 and 2-3, and 10G for each of links 1-4, 1-3, and 4-3.

Currently, there are three services D1 to D3 on the network. The D1 (route 1-2-3) occupies a bandwidth of 3G, the D2 (route 1-3) occupies a bandwidth of 10G, and the D3 (route 1-4-3) occupies a bandwidth of 7G.

After CC1 expects that after optimization is performed, a route that the D1 and the D3 need to pass through is 1-3, and a route that the D2 needs to pass through is 1-4-3.

Figure 15:
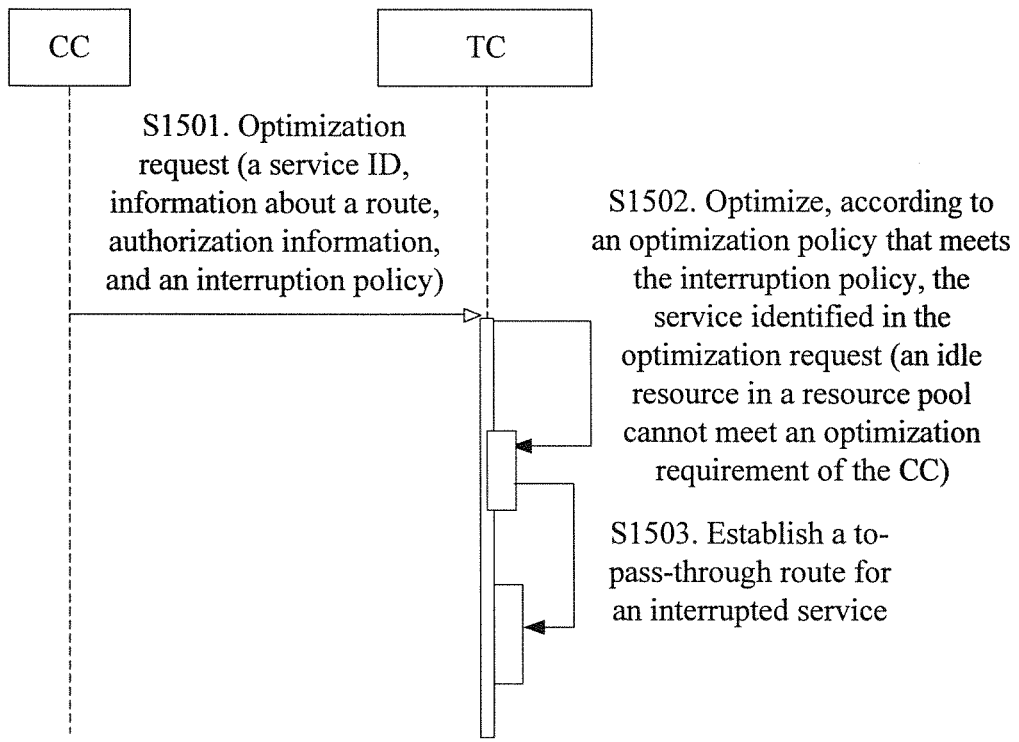
FIG. 15 is another flowchart of interaction between a CC and a TC according to an embodiment of the present invention.

If an optimization request carries an interruption policy, referring to FIG. 15, in a service optimization solution provided in this embodiment of the present invention, there may be the following interaction process between a CC1 and a TC.

S1501. The CC1 sends an optimization request to the TC. The optimization request carries a service ID, information about a route, authorization information, and an interruption policy.

If the foregoing example is still used, the service ID and a corresponding to-pass-through route carried by the optimization request include:

a service D1: (a route that the service D1 needs to pass through) 1-3;

a service D2: (a route that the service D2 needs to pass through) 1-4-3; and a service D3: (a route that the service D3 needs to pass through) 1-3.

An interruption priority sequence in the interruption policy is D2, D3, and D1.

S1502. When determining that an idle resource in a resource pool cannot meet an optimization requirement of the CC1, the TC optimizes, according to an optimization policy that meets the interruption policy, the service identified in the optimization request.

A specific implementation manner of the foregoing "optimizing, according to an optimization policy that meets the interruption policy, the service identified in the optimization request" may include:

interrupting, by the TC according to the interruption policy, a specific service to release a network resource; and adjusting, by the TC, an uninterrupted service to a to-pass-through route without service interruption.

It should be noted that when the interruption policy indicates an interruption sequence of a service, the TC may sequentially interrupt specific services according to an interruption sequence indicated by the interruption policy till a condition for optimization without service interruption is met, or till all interruptible services are interrupted and the foregoing condition for optimization without service interruption still cannot be met.

The foregoing condition for optimization without service interruption may include "an idle network resource in a resource pool supports that at least one service is adjusted to a to-pass-through route without service interruption".

The foregoing example is still used. Referring to FIG. 14, a TC may preferably interrupt a service D2 according to an interruption policy. After the service D2 is interrupted, a bandwidth of 10G of a link 1-3 may be released, and an idle network resource in a resource pool of a CC1 may support that at least one service (services D1 and D3) is adjusted to a to-pass-through route without service interruption, so as to meet the foregoing condition for optimization without service interruption.

Afterwards, the TC adjusts, by using an idle resource in a resource pool and in an establishment-before-disconnection manner, an uninterrupted service (that is, the service D1 and D3) to a to-pass-through route without service interruption.

After the TC interrupts the service D2, establishment-before-disconnection performed by the TC includes:

(1) Performing establishment-before-disconnection on the service D1, and adjusting a route from 1-2-3 to 1-3.

More specifically, the TC establishes, by using a resource (a link 1-3) in a network leased by the CC, a path whose route is 1-3 for the service D1, and then the TC disconnects a path whose route is 1-2-3 of the service D1 in the network leased by the CC.

(2) Performing establishment-before-disconnection on the service D3, and adjusting a route from 1-4-3 to 1-3.

More specifically, the TC establishes, by using the resource (the service link 1-3) in the network leased by the CC, a path whose route is 1-3 for the service D1, and then the TC disconnects a path whose route is 1-4-3 of the service D3 in the network leased by the CC.

S1503: For an interrupted service (the service D2), a service optimization performed by the TC may include: establishing a to-pass-through route for the interrupted service.

The foregoing example is still used. Because the TC disconnects the service D2, the TC establishes a path whose route is 1-4-3 for the service D2 after establishment-before-disconnection (in this case, a path whose route is 1-4-3 is released) performed on the services D1 and D3 is completed.

S1502 and S1503 may be concluded as follows: The TC optimizes, according to an optimization policy that meets the interruption policy, the service identified in the optimization request when determining that a current idle resource in a resource pool cannot meet an optimization requirement of the CC, but a condition for optimization without service interruption is met after a specific service is interrupted according to an interruption policy.

In another embodiment of the present invention, in a scenario shown in FIG. 14, if the optimization request does not include authorization information, service interruption (disconnection), establishment-before-disconnection, reestablishment of an interrupted service, and the like between the TC and the CC1 may be completed by using an answer message and an optimization instruction.

In this embodiment, the optimization policy carried by the answer message is an optimization policy that meets the interruption policy.

The foregoing example is still used. The answer message that is returned by the TC to the CC1 may carry the following content:

disconnecting a route 1-3 that bears the service D2;
establishing a route 1-3 for bearing the service D1;
disconnecting an (existing) route 1-2-3 that bears the service D1;
establishing a route 1-3 for bearing the service D3;
disconnecting an (existing) route 1-4-3 that bears the service D3; and
establishing a route 1-4-3 for bearing the service D2.

The CC initiates a corresponding optimization instruction according to an answer packet. For specific details, refer to the foregoing description in this specification. Details are not described herein again.

Figure 16:
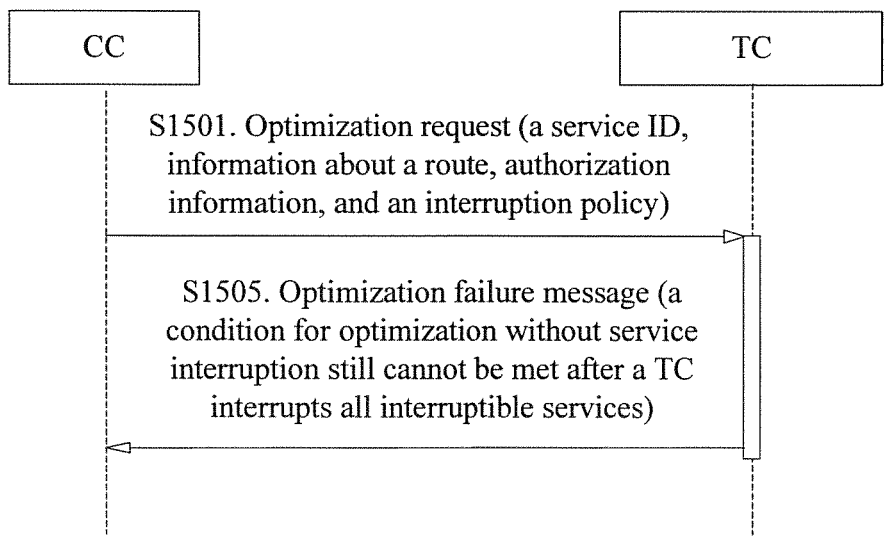
FIG. 16 is another flowchart of interaction between a CC and a TC according to an embodiment of the present invention.

In addition, in another embodiment of the present invention, referring to FIG. 16, if a condition for optimization without service interruption still cannot be met after a TC interrupts all interruptible services, the TC may return an optimization failure message.

That is, the TC returns an optimization failure message when determining that a current idle resource in a resource pool cannot meet the optimization requirement of the CC, and a condition for optimization without service interruption still cannot be met after a specific service is interrupted according to the interruption policy.

An embodiment of the present invention provides a more complex service optimization solution in the following. In this solution, optimization without service interruption is performed on some services, and reestablishment-after-interruption is performed on other services.

Figure 17:
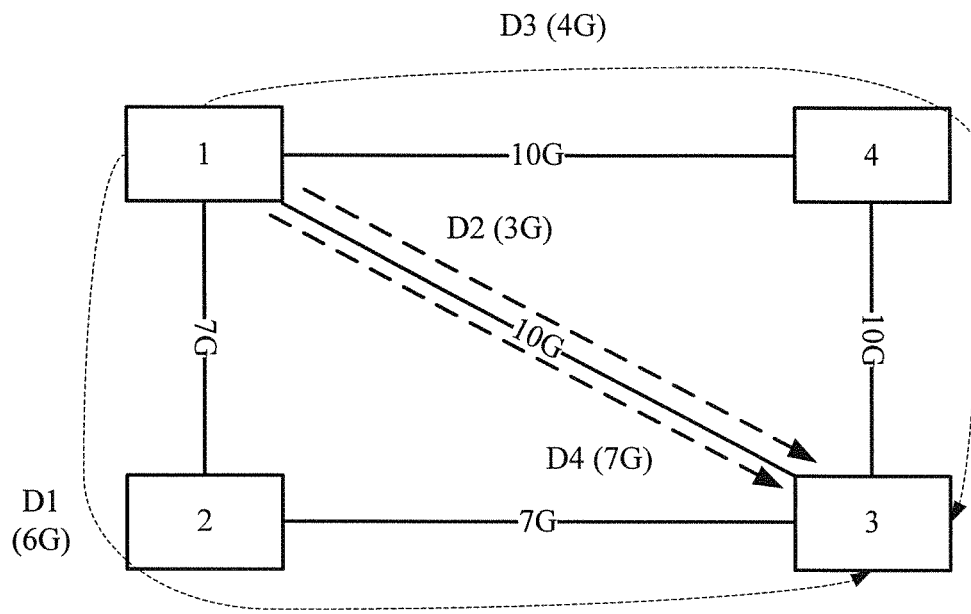
FIG. 17 is a diagram of a virtual network topology managed by a CC1 according to an embodiment of the present invention.

For example, FIG. 17 is a virtual network topology managed by a CC1 in this embodiment. There are five links in the foregoing virtual network topology, and bandwidth distribution for the links is as follows: 10G for each of links 1-3, 1-4, and 3-4, and 7G for each of links 1-2 and 2-3.

There are four services on a virtual network, and a current path of each service, and a route that the service is expected to pass through after optimization is performed are as follows:

D1 (bandwidth 6G): a current path is 1-2-3, and a route that the service D1 needs to pass through after optimization is 1-3;

D2 (bandwidth 3G): a current path is 1-3, and a route that the service D2 needs to pass through after optimization is 1-4-3;

D3 (bandwidth 4G): a current path is 1-4-3, and a route that the service D3 needs to pass through after optimization is 1-3; and D4 (bandwidth 7G): a current path is 1-3, and a route that the service D4 needs to pass through after optimization is 1-2-3.

In a scenario in which an optimization request includes an interruption policy, in a service optimization solution provided in this embodiment of the present invention, there may be the following interaction process between a CC1 and a TC.

Step 1701. The CC1 sends an optimization request to the TC. The optimization request carries a service ID, information about a route, authorization information, and an interruption policy.

It is assumed that an interruption sequence indicated by the interruption policy is D1, D2, D3, and D4.

Step 1702. The TC checks an idle resource in a resource pool, and determines whether the idle resource in the resource pool can meet an optimization requirement of a CC.

It is assumed that the TC finds that a TC resource pool includes a 4G resource for a path 1-4-3 between a source node and a sink node and another location does not have a resource. For convenience, this resource is referred to as a resource X in the following. The resource X is invisible to the CC1.

Step 1703: The TC performs, by using the resource X as a temporary resource, online optimization on at least one service (a service D2 and a service D3) in an establishment-before-disconnection manner.

The online optimization performed by the TC is as follows:

(1) The TC performs establishment-before-disconnection on a service D3, and bear the service D3 by using the temporary resource X.

(2) The TC establishes, by using a resource in a network leased by the CC1, a path whose route is 1-4-3 for the service D2, and then the TC disconnects a path whose original route is 1-3 of the service 2 on the network leased by the CC1.

Step 1704: The TC checks an idle resource in a resource pool, and determines whether the foregoing condition for optimization without service interruption is met.

Step 1705: When finding that a condition for optimization without service interruption is not met, the TC interrupts, according to an interruption policy, a service to release a network resource.

After step 1703 is completed, 3G of a link 1-3 is idle, 1G of a link 1-4-3 is idle, and 1G of a link 1-2-3 is idle. The D1 needs to occupy a bandwidth of 6G, and a D4 needs to occupy a bandwidth of 7G. A current idle network resource cannot support that any service is adjusted to a to-pass-through route without service interruption. Therefore, the TC interrupts, according to an interruption sequence in the interruption policy, the service D1 to release a bandwidth of 6G of the path whose route is 1-2-3.

Step 1706: The TC checks the idle resource in the resource pool, and determines whether the foregoing condition for optimization without service interruption is met.

Step 1707: When finding that the foregoing condition for optimization without service interruption is met, the TC performs, by using an idle network resource, online optimization on at least one service (a service D4) in an establishment-before-disconnection manner.

After the service D1 is interrupted, 3G of a link 1-3 is idle, 1G of a path 1-4-3 is idle, and 7G of a path 1-2-3 is idle, and D4 may be adjusted to a to-pass-through route. Then, the service D4 is adjusted to the path whose route is 1-2-3 by means of establishment-before-disconnection, and the path whose original route is 1-3 of the service D4 is released.

Then, the TC adjusts, by means of establishment-before-disconnection, the service D3 that is carried by using the temporary resource X to a route 1-3.

Step 1708: For an interrupted service (the service D1), the TC establishes a corresponding to-pass-through route (establishing a route 1-3 for the service D1) for the interrupted service.

In another embodiment of the present invention, in a scenario shown in FIG. 17, if the optimization request does not include authorization information, service interruption (disconnection), establishment-before-disconnection, reestablishment of an interrupted service, and the like between the TC and the CC1 are completed by using an answer message and an optimization instruction.

When online optimization is completed by using an answer message and an optimization instruction, the TC may predict an idle network resource after establishment-before-disconnection is performed and a service is interrupted, so as to formulate a whole set of disconnection sequence. In this scenario, an answer message delivered by the TC may include:

establishing a TC route for bearing a service D3;
disconnecting an (existing) 1-4-3 route that bears the service D3;
establishing a 1-4-3 route for bearing a service D2;
disconnecting an (existing) 1-3 route that bears the service D2;
disconnecting an (existing) 1-2-3 route that bears a service D1;
establishing a 1-2-3 route for bearing a service D4;
disconnecting an (existing) 1-3 route that bears the service D4;
establishing a 1-3 route for bearing the service D3;
disconnecting a TC route that bears the service D3; and
establishing a 1-3 route for bearing the service D1.

The CC initiates a corresponding optimization instruction according to an answer packet. For related details, refer to the foregoing description in this specification. Details are not described herein again.

In all the foregoing embodiments, communication between a CC and a TC may be implemented based on a Protocol—PCEP (path computation element protocol) between a PCE (path computation element) and a PCC (path computation client). Certainly, communication between the CC and the TC may also be completed based on another communication protocol.

Service optimization between the PCE and the PCC may be implemented in a manner similar to that used in the foregoing embodiment.

Figure 18A:
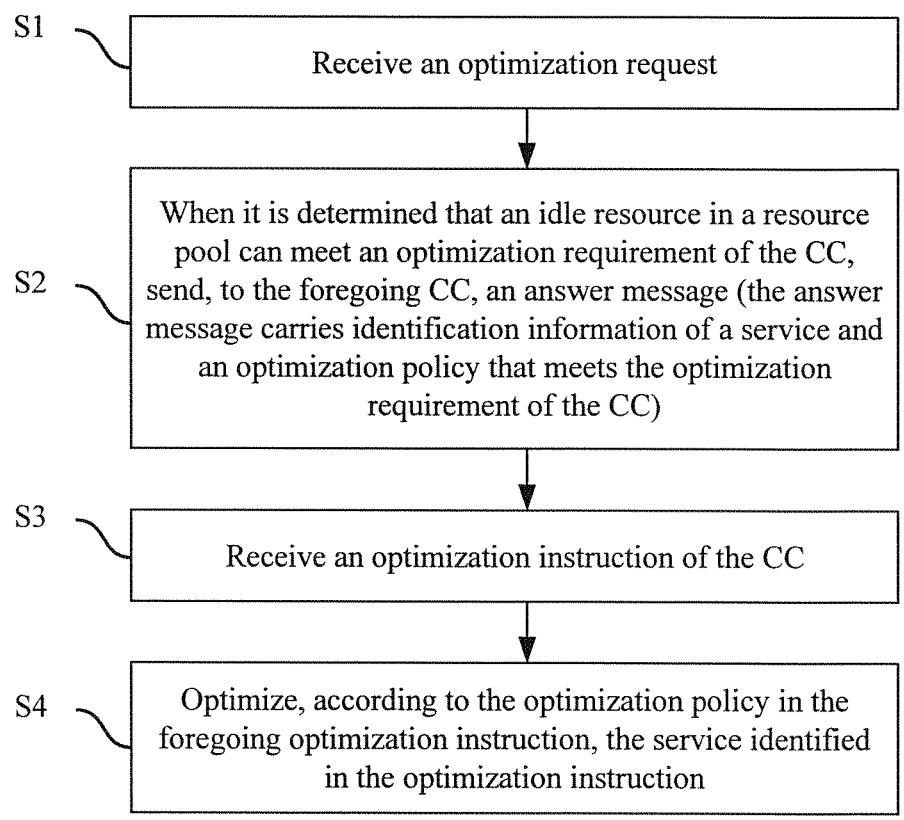
FIG. 18a, FIG. 18b, FIG. 19a, FIG. 19b, FIG. 20, and FIG. 21 are respectively flowcharts of a service optimization method according to an embodiment of the present invention.

Based on the foregoing embodiments, in another embodiment of the present invention, referring to FIG. 18*a*, a service optimization method performed by the TC may include the following steps:

S1. Receive an optimization request.

Sending of the optimization request may be triggered when the CC cannot adjust, by using an available virtual resource of the CC, a service to a route that the service needs to pass through without service interruption.

The foregoing optimization request carries at least identification information of the service and a route that the service needs to pass through.

S2. When determining that an idle resource in a resource pool can meet an optimization requirement of the foregoing CC, the foregoing TC sends an answer message to the foregoing CC, where the foregoing answer message carries the identification information of the service and an optimization policy that meets the optimization requirement of the CC.

S3. The foregoing TC receives an optimization instruction of the foregoing CC, where the optimization instruction carries the identification information of the service and an optimization policy that meets the optimization requirement of the CC.

S4. The foregoing TC optimizes, according to the optimization policy in the foregoing optimization instruction, the service identified in the foregoing optimization instruction.

Figure 18B:
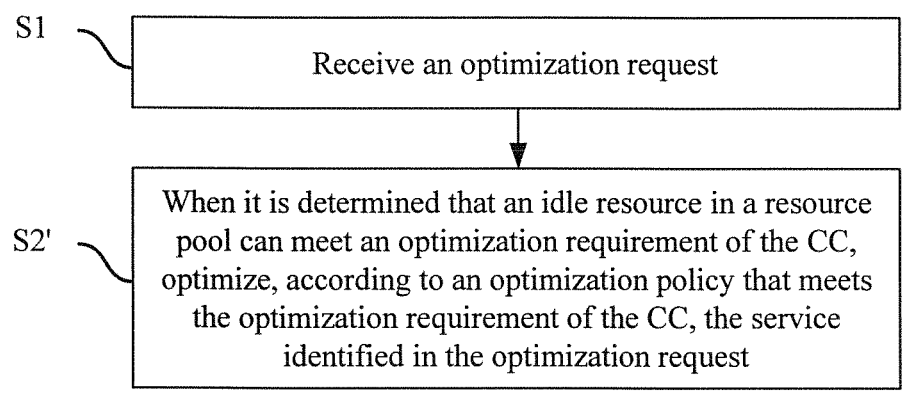

In another embodiment of the present invention, if an optimization request further carries authorization information, referring to FIG. 18*b*, a service optimization method performed by the TC may include the following steps:

S1. Receive an optimization request.

The foregoing optimization request carries identification information of a service, information about a route that the foregoing service needs to pass through, and authorization information. The authorization information is used to authorize the foregoing TC to directly complete service optimization.

S2'. When determining that an idle resource in a resource pool can meet an optimization requirement of the foregoing CC, the foregoing TC optimizes, according to an optimization policy that meets the optimization requirement of the CC, the service identified in the foregoing optimization request.

Figure 19A:
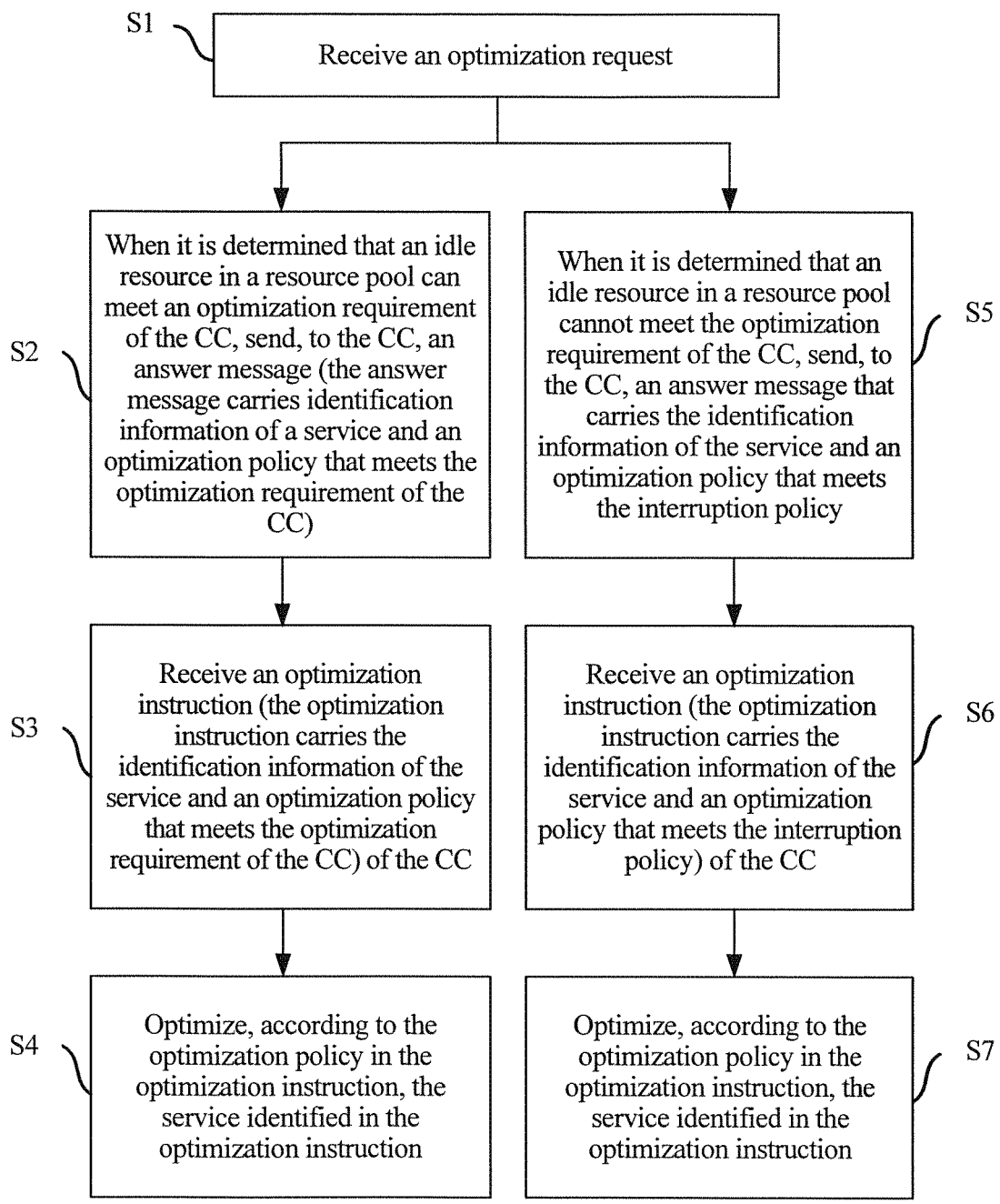

If the optimization request includes an interruption policy (For related content of the interruption policy, refer to the foregoing description in this specification), referring to FIG. 19*a*, the service optimization method performed by the TC may further include:

S5. When determining that the idle resource in the resource pool cannot meet the optimization requirement of the foregoing CC, the foregoing TC sends, to the foregoing CC, an answer message that carries the identification information of the service and an optimization policy that meets the foregoing interruption policy.

More specifically, the TC sends, to the foregoing CC, the answer message that carries the identification information of the service and the optimization policy that meets the foregoing interruption policy when determining that the idle resource in the resource pool cannot meet the optimization requirement of the foregoing CC, but a condition for optimization without service interruption may be met after the specific service is interrupted according to the interruption policy.

S6. The foregoing TC receives an optimization instruction of the foregoing CC, where the optimization instruction carries the identification information of the service and an optimization policy that meets the interruption policy.

S7. The foregoing TC optimizes, according to the optimization policy in the foregoing optimization instruction, the service identified in the foregoing optimization instruction.

Figure 19B:
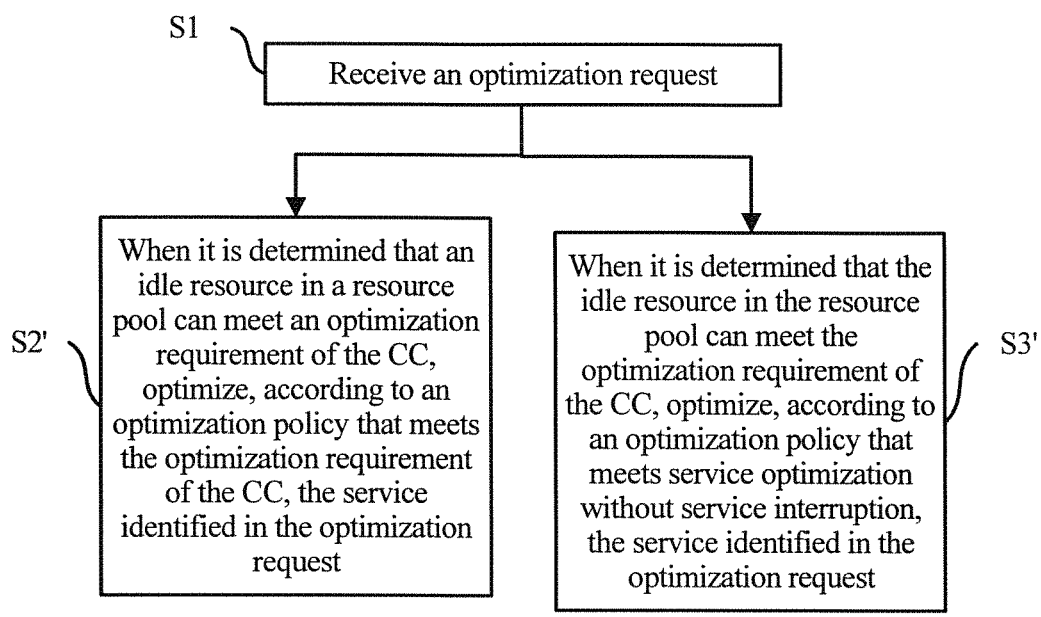

In another embodiment of the present invention, if an optimization request further carries authorization information and an interruption policy, referring to FIG. 19b, a service optimization method performed by the TC may include the following steps:

S3'. When determining that an idle resource in a resource pool cannot meet an optimization requirement of the foregoing CC, the foregoing TC optimizes, according to an optimization policy that meets the foregoing interruption policy, the service identified in the foregoing optimization request.

More specifically, the TC optimizes, according to the optimization policy that meets the foregoing interruption policy, the service identified in the foregoing optimization request when determining that the idle resource in the resource pool cannot meet the optimization requirement of the foregoing CC, but a condition for optimization without service interruption may be met after the specific service is interrupted according to the interruption policy.

More specifically, the foregoing optimizing, according to an optimization policy that meets the foregoing interruption policy, the service identified in the foregoing optimization request may include:

interrupting, by the foregoing TC according to the foregoing interruption policy, the specific service to release a network resource; and adjusting, by the foregoing TC, an uninterrupted service to a to-pass-through route without service interruption.

In another embodiment of the present invention, "optimizing, according to an optimization policy that meets the foregoing interruption policy, the service identified in the foregoing optimization request" in all the foregoing embodiments may further include:

establishing, by the foregoing TC, a to-pass-through route for an interrupted service.

When the foregoing condition for optimization without service interruption still cannot be met after all interruptible services are interrupted, a service optimization method performed by the TC may further include: returning an optimization failure message.

Figure 20:
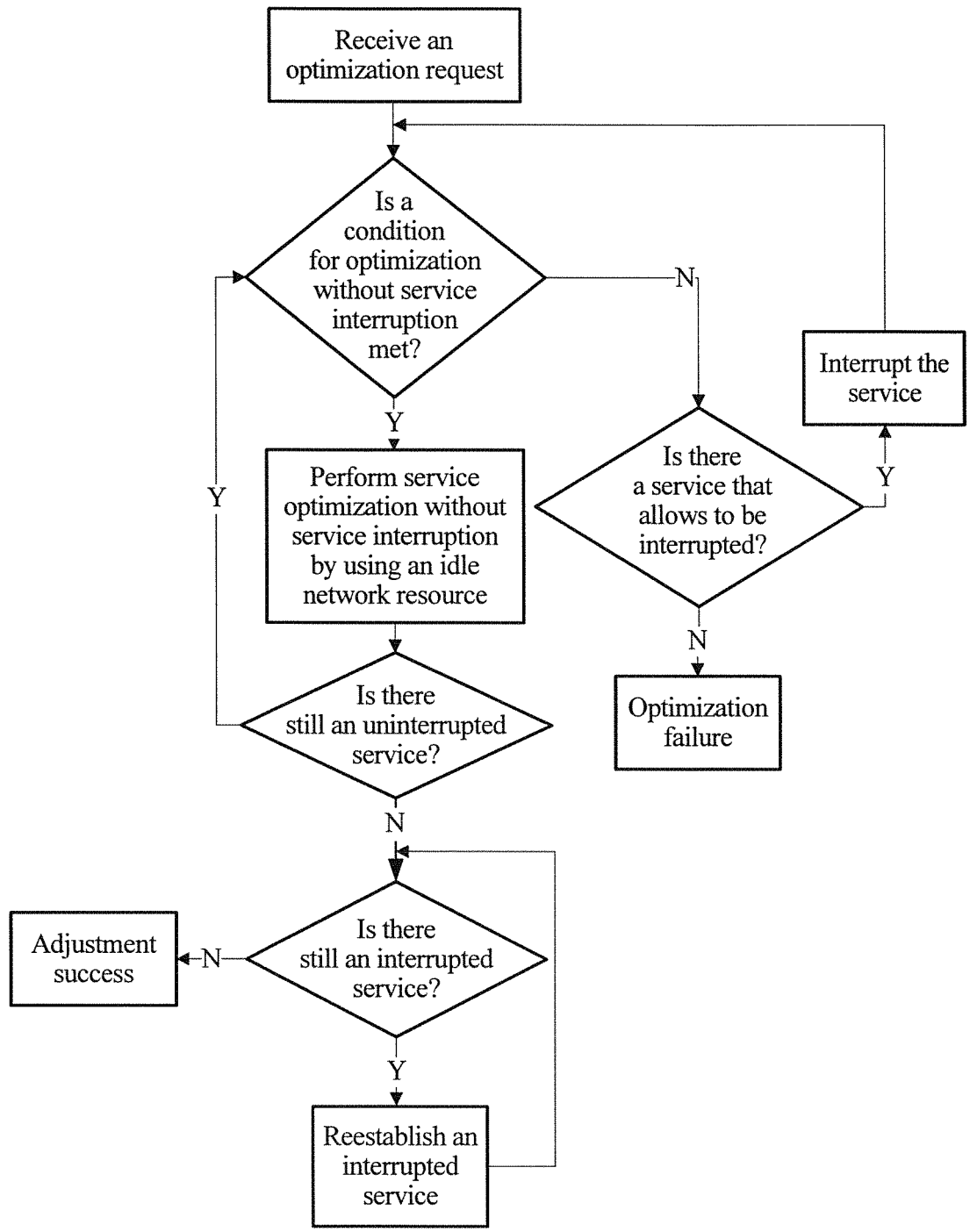

FIG. 20 describes a process of a service optimization method from another perspective.

For specific details, refer to the foregoing description in this specification. Details are not described herein again.

Figure 21:
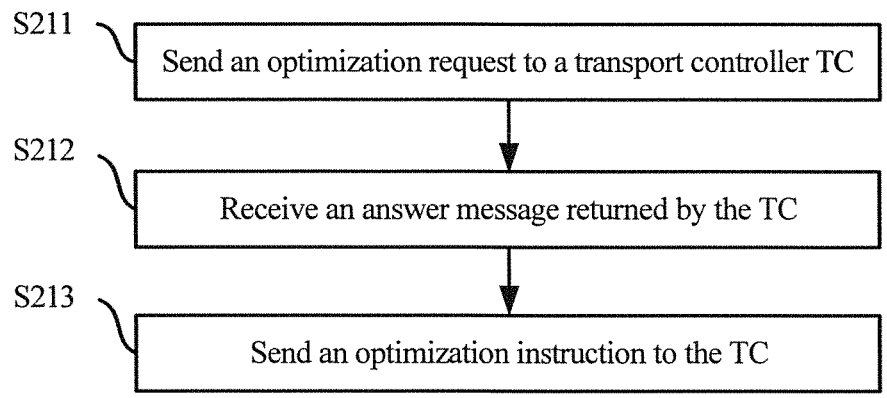

Correspondingly, referring to FIG. 21, a service optimization method performed by the CC may include the following steps:

S211. The CC sends an optimization request to a TC, where the optimization request carries identification information of a service and information about a route that the service needs to pass through.

S212. The foregoing CC receives an answer message returned by the foregoing TC, where the foregoing answer message carries the identification information of the service and a corresponding optimization policy.

S213. The foregoing CC sends an optimization instruction to the foregoing TC, where the optimization instruction carries the identification information of the service and a corresponding optimization policy, and the optimization instruction is used by the foregoing TC to optimize, according to the optimization policy in the foregoing optimization instruction, the service identified in the foregoing optimization instruction.

When the foregoing TC determines that an idle resource in a resource pool can meet an optimization requirement of the foregoing CC, both the optimization policy carried by the foregoing answer message and the optimization policy carried by the foregoing optimization instruction are optimization policies that meet the optimization requirement of the CC.

In another embodiment of the present invention, the foregoing optimization request may further carry an interruption policy for a specific service. When the foregoing TC determines that the idle resource in the resource pool cannot meet the optimization requirement of the foregoing CC, both the optimization policy carried by the foregoing answer message and the optimization policy carried by the foregoing optimization instruction are optimization policies that meet the foregoing interruption policy.

More specifically, when the TC determines that the idle resource in the resource pool cannot meet the optimization requirement of the foregoing CC, but a condition for optimization without service interruption may be met after the specific service is interrupted according to the interruption policy, both the optimization policy carried by the foregoing answer message and the optimization policy carried by the foregoing optimization instruction are optimization policies that meet the foregoing interruption policy.

Figure 22:
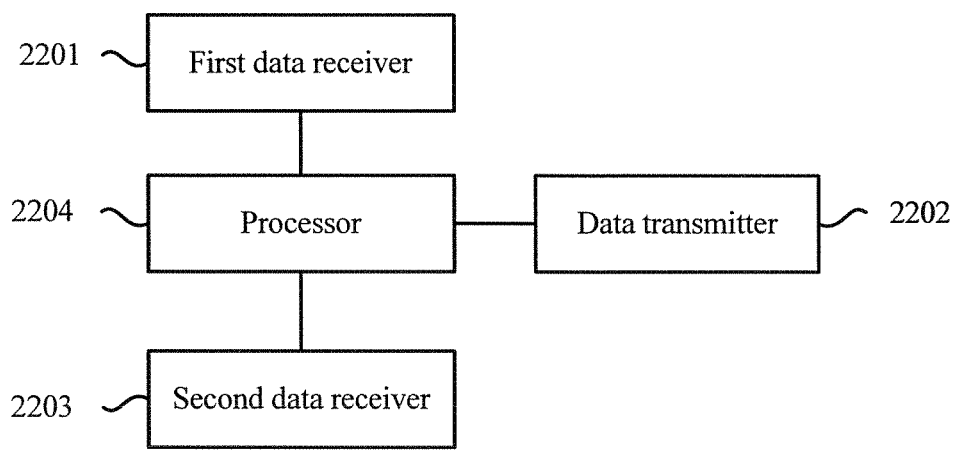
FIG. 22 and FIG. 23 are respectively exemplary diagrams of a structure of a transport controller according to an embodiment of the present invention.

Correspondingly, an embodiment of the present invention further claims a transport controller (TC). Referring to FIG. 22, the TC may include:

a first data receiver 2201, configured to receive an optimization request from a client controller CC, where the optimization request carries identification information of a service and information about a route that the service needs to pass through;

a data transmitter 2202, configured to send an answer message to the foregoing CC when a processor 2204 determines that an idle resource in a resource pool can meet an optimization requirement of the foregoing CC, where the foregoing answer message carries the identification information of the service and a corresponding optimization policy;

a second data receiver 2203, configured to receive an optimization instruction of the CC, where the optimization instruction carries the identification information of the service and a corresponding optimization policy; and a processor 2204, configured to optimize, according to the optimization policy in the foregoing optimization instruction, the service identified in the foregoing optimization instruction.

When the foregoing processor 2204 determines that the idle resource in the resource pool can meet the optimization requirement of the foregoing CC, both the optimization policy carried by the foregoing answer message and the optimization policy carried by the foregoing optimization instruction are optimization policies that meet the optimization requirement of the CC.

In another embodiment of the present invention, the optimization request in all the foregoing embodiments may further carry an interruption policy for a specific service. When the foregoing processor 2204 determines that the idle resource in the resource pool cannot meet the optimization requirement of the foregoing CC, both the optimization policy carried by the foregoing answer message and the optimization policy carried by the foregoing optimization instruction are optimization policies that meet the foregoing interruption policy.

More specifically, both the optimization policy carried by the foregoing answer message and the optimization policy carried by the foregoing optimization instruction are optimization policies that meet the foregoing interruption policy when the processor 2204 determines that the idle resource in the resource pool cannot meet the optimization requirement of the foregoing CC, but a condition for optimization without service interruption may be met after the specific service is interrupted according to the interruption policy.

For specific details, refer to the foregoing description in this specification. Details are not described herein again.

Figure 23:
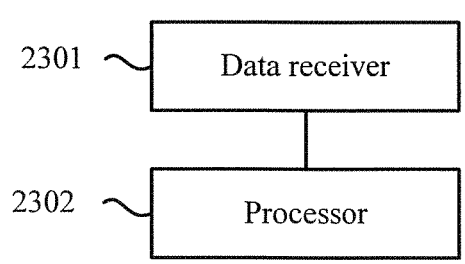

Refer to FIG. 23, which is another structure of the foregoing transport controller. The transport controller may include:

a data receiver 2301, configured to receive an optimization request from a client controller (CC), where the optimization request carries identification information of a service, information about a route that the foregoing service needs to pass through, and authorization information, and the authorization information is used to authorize the TC to directly complete service optimization; and a processor 2302, configured to optimize, according to an optimization policy that meets an optimization requirement of the CC, the service identified in the optimization request when determining that an idle resource in a resource pool can meet the optimization requirement of the CC.

In another embodiment of the present invention, the optimization request in all the foregoing embodiments may further carry an interruption policy for a specific service. The foregoing processor 2302 may further configured to: when determining that the idle resource in the resource pool cannot meet the optimization requirement of the foregoing CC, optimize, according to the optimization policy that meets the interruption policy, the service identified in the foregoing optimization request.

For specific details, refer to the foregoing description in this specification. Details are not described herein again.

Figure 24:
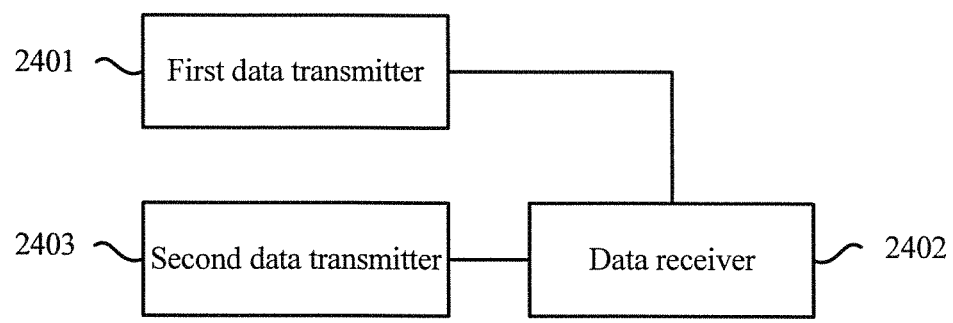
FIG. 24 is an exemplary diagram of a structure of a client controller according to an embodiment of the present invention.

Correspondingly, an embodiment of the present invention further claims a client controller (CC). Referring to FIG. 24, the foregoing CC may include:

a first data transmitter 2401, configured to send an optimization request to a TC to which the first data transmitter 2401 is connected, where the optimization request carries identification information of a service and information about a route that the service needs to pass through;

a data receiver 2402, configured to receive an answer message that is from the TC and that carries the identification information of the service and an optimization policy; and a second data transmitter 2403, configured to send an optimization instruction to the foregoing TC, where the optimization instruction carries the identification information of the service and a corresponding optimization policy, and the optimization instruction is used by the foregoing TC to optimize, according to the optimization policy in the foregoing optimization instruction, the service identified in the foregoing optimization instruction.

It should be noted that when the foregoing TC determines that an idle resource in a resource pool can meet an optimization requirement of the foregoing CC, both the optimization policy carried by the foregoing answer message and the optimization policy carried by the foregoing optimization instruction are optimization policies that meet the optimization requirement of the CC.

In another embodiment of the present invention, the optimization request in all the foregoing embodiments may further carry an interruption policy for a specific service. When the TC determines that the idle resource in the resource pool cannot meet the optimization requirement of the foregoing CC, both the optimization policy carried by the foregoing answer message and the optimization policy carried by the foregoing optimization instruction are optimization policies that meet the foregoing interruption policy.

More specifically, when the TC determines that the idle resource in the resource pool cannot meet the optimization requirement of the foregoing CC, but a condition for optimization without service interruption may be met after the specific service is interrupted according to the interruption policy, both the optimization policy carried by the foregoing answer message and the optimization policy carried by the foregoing optimization instruction are optimization policies that meet the foregoing interruption policy.

For specific details, refer to the foregoing description in this specification. Details are not described herein again.

Correspondingly, an embodiment of the present invention further claims a service optimization system, including a transport controller (TC) and a client controller (CC).

The foregoing CC is configured to: send an online optimization request to the foregoing TC, where the optimization request carries identification information of a service and information about a route that the service needs to pass through; receive an answer message that is of the foregoing TC and that carries the identification information of the service and a corresponding optimization policy; and send an optimization instruction to the foregoing TC, where the optimization instruction carries the identification information of the service and a corresponding optimization policy.

The foregoing TC is configured to: when determining that an idle resource in a resource pool can meet an optimization requirement of the foregoing CC, send the foregoing answer message to the foregoing CC, and optimize, according to the optimization policy in the foregoing optimization instruction, the service identified in the foregoing optimization instruction.

It should be noted that when the foregoing TC determines that an idle resource in a resource pool can meet an optimization requirement of the foregoing CC, both the optimization policy carried by the foregoing answer message and the optimization policy carried by the foregoing optimization instruction are optimization policies that meet the optimization requirement of the CC.

In another embodiment of the present invention, the optimization request in all the foregoing embodiments may further carry an interruption policy for a specific service. When the TC determines that the idle resource in the resource pool cannot meet the optimization requirement of the foregoing CC, both the optimization policy carried by the foregoing answer message and the optimization policy carried by the foregoing optimization instruction are optimization policies that meet the foregoing interruption policy.

More specifically, when the TC determines that the idle resource in the resource pool cannot meet the optimization requirement of the foregoing CC, but a condition for optimization without service interruption may be met after the specific service is interrupted according to the interruption policy, both the optimization policy carried by the foregoing answer message and the optimization policy carried by the foregoing optimization instruction are optimization policies that meet the foregoing interruption policy.

For specific details, refer to the foregoing description in this specification. Details are not described herein again.

The embodiments in this specification are all described in a progressive manner, for same or similar parts in the embodiments, reference may be made to these embodiments, and each embodiment focuses on a difference from other embodiments. The apparatus provided in the embodiments is described relatively simply because it corresponds to the method provided in the embodiments, and for portions related to those of the method, reference may be made to the description of the method.

It should be noted that in this specification, relational terms such as "first" and "second" are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

Through the foregoing description of the embodiments, it may be clearly understood by persons skilled in the art that the present invention may be implemented by software plus necessary universal hardware, where the universal hardware includes a universal integrated circuit, a universal CPU, a universal memory, a universal device, and the like, and definitely may also be implemented by application-specific hardware, like an application-specific integrated circuit, an application-specific CPU, an application-specific memory, an application-specific device, and the like, but in many cases, the former one is preferred. Based on such understandings, the essence of the technical solutions of the present invention or the part that makes contributions to the prior art can be embodied in a software product. The computer software product may be stored in a readable storage medium such as a USB flash disk, a mobile hard disk, a read-only memory (ROM), a random access memory (RAM), a magnetic disk, or an optical disc, where the storage medium incorporates several instructions causing a computer device (such as a personal computer, a server, or a network device) to perform the method specified in each embodiment of the present invention.

The embodiments provided above are described to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention is not intended to be limited to these embodiments illustrated in this specification, but shall be construed in the widest scope consistent with the principles and novel features provided in this specification.

What is claimed is:

1. A service optimization method, comprising:
receiving, by a transport controller (TC), an optimization request from a client controller (CC), wherein the optimization request carries identification information of a service and information about a route that the service needs to pass through;
sending, by the TC, a response message to the CC when determining that an idle resource in a resource pool can meet an optimization requirement of the CC, wherein the response message carries the identification information of the service and a first optimization policy that meets the optimization requirement of the CC;
receiving, by the TC, an optimization instruction of the CC, wherein the optimization instruction carries the identification information of the service and a corresponding optimization policy that meets the optimization requirement of the CC; and
optimizing, by the TC according to the optimization policy in the optimization instruction, the service identified in the optimization instruction without service interruption,
wherein the first optimization policy that meets the optimization requirement of the CC is configured to indicate establishment-before-disconnection.

2. The method according to claim 1, wherein:
the optimization request further carries an interruption policy for a specific service; and
the method further comprises:
when determining that the idle resource in the resource pool cannot meet the optimization requirement of the CC, sending, by the TC, to the CC, a response message that carries the identification information of the service and a second optimization policy that meets the interruption policy;
receiving, by the TC, an optimization instruction of the CC, wherein the optimization instruction carries the identification information of the service and third optimization policy that meets the interruption policy; and
optimizing, by the TC according to the third optimization policy in the optimization instruction, the service identified in the optimization instruction.

3. The method according to claim 1, wherein when the optimization instruction received by the TC comprises identification information of a single service, and an optimization policy for the single service, optimizing, by the TC according to the optimization policy for the single service in the optimization instruction, the service identified in the optimization instruction comprises:
optimizing, by the TC, the single service according to the optimization policy in the optimization instruction.

4. The method according to claim 1, wherein when the optimization instruction received by the TC comprises identification information of multiple services and an optimization policy for the multiple services, optimizing, by the TC according to the optimization policy for the multiple services in the optimization instruction, the service identified in the optimization instruction comprises:
optimizing, by the TC, the multiple services according to the optimization policy in the optimization instruction.

5. The method according to claim 1, wherein the information about the route carries node information about a node that the service passes through, and the node comprises a start node and an end node; and determining, by the TC, whether the idle resource in the resource pool can meet the optimization requirement of the CC comprises: determining whether an idle resource between the start node and the end node in the resource pool meets the optimization requirement of the CC.

6. A service optimization method, comprising:
sending, by a client controller (CC), an optimization request to a transport controller (TC), wherein the optimization request carries identification information of a service and information about a route that the service needs to pass through;

receiving, by the CC, a response message returned by the TC, wherein the response message carries the identification information of the service and a first optimization policy;

sending, by the CC, an optimization instruction to the TC, wherein the optimization instruction carries the identification information of the service and a second optimization policy, and the optimization instruction is used by the TC to optimize, according to the second optimization policy in the optimization instruction, the service identified in the optimization instruction; and wherein when the TC determines that an idle resource in a resource pool can meet an optimization requirement of the CC, both the first optimization policy carried by the response message and the second optimization policy carried by the optimization instruction are optimization policies that meet the optimization requirement of the CC, wherein the first optimization policy carried by the response message is configured to indicate establishment-before-disconnection.

7. The method according to claim 6, wherein:

the optimization request further carries an interruption policy for a specific service; and when the TC determines that the idle resource in the resource pool cannot meet the optimization requirement of the CC, both the first optimization policy carried by the response message and the second optimization policy carried by the optimization instruction are optimization policies that meet the interruption policy.

8. A transport controller, comprising:

a first data receiver, configured to receive an optimization request from a client controller (CC), wherein the optimization request carries identification information of a service and information about a route that the service needs to pass through;

a data transmitter, configured to send a response message to the CC when a processor determines that an idle resource in a resource pool can meet an optimization requirement of the CC, wherein the response message carries the identification information of the service and a first optimization policy;

a second data receiver, configured to receive an optimization instruction of the CC, wherein the optimization instruction carries the identification information of the service and a second optimization policy; and wherein the processor is configured to optimize, according to the second optimization policy in the optimization instruction, the service identified in the optimization instruction, and wherein when the processor determines that the idle resource in the resource pool can meet the optimization requirement of the CC, both the first optimization policy carried by the response message and the second optimization policy carried by the optimization instruction are optimization policies that meet the optimization requirement of the CC, wherein the first optimization policy that meets the optimization requirement of the CC is configured to indicate establishment-before-disconnection.

9. The transport controller according to claim 8, wherein:

the optimization request further carries an interruption policy for a specific service; and when the processor determines that the idle resource in the resource pool cannot meet the optimization requirement of the CC, both the first optimization policy carried by the response message and the second optimization policy carried by the optimization instruction are optimization policies that meet the interruption policy.

10. The transport controller according to claim 8, wherein when the optimization instruction received by the TC comprises identification information of a single service, and an optimization policy for the single service, the processor is configured to:

optimize the single service according to the optimization policy for the single service in the optimization instruction.

11. The transport controller according to claim 8, wherein when the optimization instruction received by the TC comprises identification information of multiple services and an optimization policy for the multiple services, the processor is configured to:

optimize the multiple services according to the optimization policy for the multiple services in the optimization instruction.

12. The transport controller according to claim 8, wherein:

the information about the route carries node information about a node that the service passes through, and the node comprises a start node and an end node; and the processor is configured to: determine whether an idle resource between the start node and the end node in the resource pool meets the optimization requirement of the CC.

13. A transport controller, comprising:

a data receiver, configured to receive an optimization request from a client controller (CC), wherein the optimization request carries identification information of a service, information about a route that the service needs to pass through, and authorization information, and the authorization information is configured to authorize the TC to directly complete service optimization; and a processor, configured to optimize, according to an optimization policy that meets an optimization requirement of the CC, the service identified in the optimization request when determining that an idle resource in a resource pool can meet the optimization requirement of the CC, wherein the optimization policy that meets the optimization requirement of the CC is configured to indicate establishment-before-disconnection.

14. The transport controller according to claim 13, wherein the processor is configured to:

adjust, by using the idle resource in the resource pool, the service identified in the optimization request to a to-pass-through route without service interruption.

15. The transport controller according to claim 13, wherein:

the optimization request further carries an interruption policy for a specific service; and the processor is further configured to: optimize, according to an optimization policy that meets the interruption policy, the service identified in the optimization request when the processor determines that the idle resource in the resource pool cannot meet the optimization requirement of the CC.

16. The transport controller according to claim 15, wherein the processor is configured to:

interrupt according to the interruption policy, the specific service to release a network resource; and adjust an uninterrupted service to a to-pass-through route without service interruption.

17. The transport controller according to claim 16, wherein the processor is further configured to:

establish a to-pass-through route for an interrupted service.

* * * * *